US008368686B2

(12) United States Patent
Sommers

(10) Patent No.: US 8,368,686 B2
(45) Date of Patent: *Feb. 5, 2013

(54) RESOURCE MANAGEMENT FOR RULE-BASED PROCEDURAL TERRAIN GENERATION

(75) Inventor: Anthony L. Sommers, Austin, TX (US)

(73) Assignee: Sony Online Entertainment LLC, San Diego, CA (US)

( * ) Notice: Subject to any disclaimer, the term of this patent is extended or adjusted under 35 U.S.C. 154(b) by 1156 days.

This patent is subject to a terminal disclaimer.

(21) Appl. No.: 10/876,749

(22) Filed: Jun. 25, 2004

(65) Prior Publication Data

US 2005/0264576 A1 Dec. 1, 2005

Related U.S. Application Data

(60) Provisional application No. 60/575,035, filed on May 26, 2004.

(51) Int. Cl.
*G06T 15/00* (2011.01)
*G06T 17/00* (2006.01)
(52) U.S. Cl. .................................. 345/419; 345/420
(58) Field of Classification Search .................. None
See application file for complete search history.

(56) References Cited

U.S. PATENT DOCUMENTS

| | | | | |
|---|---|---|---|---|
| 4,729,127 | A | * | 3/1988 | Chan et al. ............. 382/240 |
| 5,757,386 | A | * | 5/1998 | Celi et al. ............. 345/548 |
| 5,790,123 | A | | 8/1998 | Wald et al. |
| 5,889,951 | A | * | 3/1999 | Lombardi ............. 709/219 |
| 5,956,039 | A | * | 9/1999 | Woods et al. ............. 345/419 |
| 6,049,666 | A | | 4/2000 | Bennett et al. |
| 6,229,546 | B1 | | 5/2001 | Lancaster et al. |
| 6,268,869 | B1 | | 7/2001 | Ugajin et al. |
| 6,362,817 | B1 | | 3/2002 | Powers et al. |
| 6,597,354 | B2 | | 7/2003 | Sakamoto et al. |
| 6,747,649 | B1 | | 6/2004 | Sanz-Pastor et al. |
| 6,831,659 | B1 | | 12/2004 | Mukoyama et al. |
| 6,933,946 | B1 | * | 8/2005 | Silva et al. ............. 345/582 |
| 6,952,207 | B1 | | 10/2005 | Santodomingo et al. |
| 7,098,868 | B2 | | 8/2006 | Love et al. |
| 2002/0060685 | A1 | | 5/2002 | Handley et al. |

(Continued)

OTHER PUBLICATIONS

Hammes, Johan. 2001. "Modeling of Ecosystems as a Data Source for Real-time Terrain Rendering." Digital Earth Moving, 2001: First International Symposium. 14pp. Available http://www.cimsi.cim.ch/dem2001/.*

(Continued)

*Primary Examiner* — Daniel Hajnik
(74) *Attorney, Agent, or Firm* — Samuel S. Lee; Procopio, Cory, Hargreaves & Savitch LLP

(57) ABSTRACT

Disclosed are systems and methods for rule-based procedural generation of terrain in real time for a virtual world. By describing the terrain with rules rather than storing the actual geometry data, a drastic savings in terms of memory and disk space is achieved by generating terrain procedurally on the fly in real time when it is necessary. Using the terrain editor tool, the terrain system allows defining and modifying the terrain height, color, shaders, textures, flora, and environment, for example. Additionally, generating the terrain procedurally allows for almost limitless detail by changing the parameters used to create the terrain geometry. These rules can also be added and removed dynamically, leading to terrain modification in real time. In addition, resources are managed for the terrain generation system, such as allocating memory for areas of virtual terrain; associating a priority level to each virtual terrain for memory management; and deallocating memory of the virtual terrain based at least in part on the priority levels of the areas of virtual terrain.

24 Claims, 35 Drawing Sheets

U.S. PATENT DOCUMENTS

2004/0143852 A1* 7/2004 Meyers .................... 725/133
2005/0156928 A1* 7/2005 Santodomingo et al. ..... 345/428
2005/0171754 A1* 8/2005 Santodomingo et al. ....... 703/21

OTHER PUBLICATIONS

The Daytona USA 2001 Videogame Description and Screenshots from http://www.gamekult.com, 2001.*

"Planet Design", http://starwarsgalaxies.station.sony.com/oldarchives.jsp?id=56343&page=Home, Jun. 2002, printed Nov. 23, 2004.

Bryce 5.0 User Manual, 2001, Chapter 5, p. 91-117.

Office Action dated Feb. 23, 2007 in U.S. Appl. No. 10/877,515.

Amendment filed Jun. 25, 2007 in response to office action dated Feb. 23, 2007 in U.S. Appl. No. 10/877,515.

Office Action dated Feb. 22, 2007 in U.S. Appl. No. 10/877,512.

Amendment filed Jun. 19, 2007 in response to office action dated Feb. 22, 2007 in U.S. Appl. No. 10/877,512.

* cited by examiner

400

500

930

1150

1220

1470

980

1040

830

| Flora Parameters | | | | | | |
|---|---|---|---|---|---|---|
| | Maximum Distance | Minimum Distance | Tile Size | Tile Border | Seed | Approx. Total Flora |
| Collidable | 128 | 0 | 6 | 2.25 | 0 | 1429 |
| Non-collidable | 50 | 0 | 4 | 1 | 0 | 490 |
| Near Radial | 30 | 0 | 1 | 0.42 | 0 | |
| Far Radial | 700 | 105 | 42 | 17 | 0 | 853 |

3200

OK    Cancel

*FIG. 32*

RESOURCE MANAGEMENT FOR RULE-BASED PROCEDURAL TERRAIN GENERATION

RELATED APPLICATIONS

This application claims priority under 35 U.S.C. §119(e) to U.S. Provisional Application No. 60/575,035, filed May 26, 2004 and titled "RULE-BASED PROCEDURAL GENERATION OF TERRAIN," which is hereby incorporated by reference in its entirety. This application is related to U.S. patent application Ser. No. 10/877,515, filed on even date herewith and titled "RULE-BASED PROCEDURAL TERRAIN GENERATION" and U.S. patent application Ser. No. 10/877,512, filed on even date herewith and titled "TERRAIN EDITOR TOOL FOR RULE-BASED PROCEDURAL TERRAIN GENERATION," both of which are hereby incorporated by reference in their entireties.

BACKGROUND OF THE INVENTION

1. Field of the Invention

The present invention generally relates to the field of terrain generation. More particularly, the invention relates to rule-based procedural generation of terrain metadata in real time for display of a virtual world.

2. Description of the Related Technology

In certain computer applications, for example, personal computer (PC) games such as three-dimensional (3 D) massively multiplayer online games, virtual worlds having virtual terrain may be created. The terrain generation can include generating objects and features such as rivers, roads, flora, lighting, landmass, celestial objects, environmental features, mud and rocks. Traditional terrain generation systems require 3 D terrain artists to manually enter very detailed and lengthy terrain definitions, which are stored on one or more terrain databases.

In massively multiplayer online computer games, an avatar refers to a graphical icon or image that represents a real person or character. For example, when the game player enters the game system, the player can often choose from a number of avatars. Sophisticated 3 D avatars can even change shape depending on what they are presently doing, for example, walking, sitting, running, etc.

Traditional terrain generation and rendering systems suffer from many drawbacks and limitations. For example, entry of terrain data is often a time consuming process that can take terrain artists a great deal of time to enter and modify. In addition, terrain generation systems typically consume very large amounts of database storage space and processing resources to store, generate and render the terrain data. Still further, in terrain generation systems that require the transfer of terrain data across a network to be rendered on a user's computer system, the terrain data cannot be transferred fast enough to support the update rate necessary for smooth rendering of the terrain.

Therefore, what is needed are rule-based systems and methods for very efficiently defining, generating and rendering terrain data in real time for virtual world applications, for example, for 3 D massively multiplayer online games.

SUMMARY OF CERTAIN INVENTIVE ASPECTS

Certain embodiments of the present invention are directed to a method of generating terrain in a virtual world. The method comprises receiving in a terrain generator a plurality of procedural rules that define the terrain in a virtual world, wherein each rule affects the generation of a portion of the terrain, generating terrain in the virtual world in accordance with the plurality of procedural rules by writing data to a buffer for rendering terrain in real time on a visual display, and providing a resource management policy for deallocating memory allocated to unused or unnecessary portions of the terrain.

Additional embodiments are directed to a method of managing virtual terrain. The method comprises allocating memory for a plurality of areas of virtual terrain, associating a priority level to each of the areas of virtual terrain, and deallocating memory of the virtual terrain based at least in part on the priority levels of the areas of virtual terrain.

The method can additionally comprise assigning a priority level to areas the virtual terrain where an avatar is positioned. The method can additionally comprise assigning a priority level to areas of the virtual terrain that are proximate to the avatar.

In the method, the priority level assigned to the areas of the virtual terrain where the avatar is positioned can be higher than the priority level assigned to the areas of the virtual terrain that are proximate to the avatar. In addition, one of four priority levels can assigned to the areas of the virtual terrain where an avatar is positioned and to areas of the virtual terrain that are proximate to the avatar. Still further, deallocating can occur when the number of areas of the virtual terrain exceeds a threshold.

Additional embodiments are directed to a system for managing virtual terrain. The method comprises a means for allocating memory for a plurality of areas of virtual terrain, a means for associating a priority level to each of the areas of virtual terrain, and a means for deallocating memory of the virtual terrain based at least in part on the priority levels of the virtual terrain.

The system can additionally comprise a means for assigning a priority level to areas the virtual terrain where an avatar is positioned. The system can additionally comprise a means for assigning a priority level to areas of the virtual terrain that are proximate to an avatar. In addition, the means for deallocating can be invoked when the number of areas of the virtual terrain exceeds a threshold.

Additional embodiments are directed to a program storage device storing instructions that perform the method comprising allocating memory for a plurality of areas of virtual terrain, associating a priority level to each of the areas of virtual terrain, and deallocating memory of the virtual terrain based at least in part on the priority levels of the virtual terrain.

The program storage device can additionally comprise assigning a priority level to areas the virtual terrain where an avatar is positioned. The program storage device can additionally comprise assigning a priority level to areas of the virtual terrain that are proximate to an avatar. In the program storage device, the deallocating can occur when the number of areas of the virtual terrain exceeds a threshold.

Additional embodiments are directed to a system for managing memory. The system comprises a plurality of areas of virtual terrain, each of the areas of virtual terrain having an associated priority level, and a terrain manager for allocating and deallocating memory for the virtual terrain based at least in part on the priority level.

In the system, areas of the virtual terrain that are near an avatar can have a selected priority level. In addition, areas of the virtual terrain that include an avatar can have a selected priority level.

Additional embodiments are directed to a method of managing virtual terrain data. The method comprises maintaining a list of unused terrain memory buffers, in response to a request for a terrain memory buffer, determining whether the list contains at least one terrain memory buffer, if the set contains at least one terrain memory buffer, providing the terrain memory buffer, and if the set does not contain at least one terrain memory buffer, requesting an operating system to provide a new terrain memory buffer. The method can additionally comprise adding, after use, a terrain memory buffer to the set of unused terrain memory buffers.

BRIEF DESCRIPTION OF THE DRAWINGS

The above and other aspects, features and advantages of the invention will be better understood by referring to the following detailed description, which should be read in conjunction with the accompanying drawings. These drawings and the associated description are provided to illustrate certain embodiments of the invention, and not to limit the scope of the invention.

FIG. 32 is an example of a screen snapshot showing a window for display and entry of flora parameters using the terrain editor tool.

DETAILED DESCRIPTION OF CERTAIN EMBODIMENTS

Figure 1:
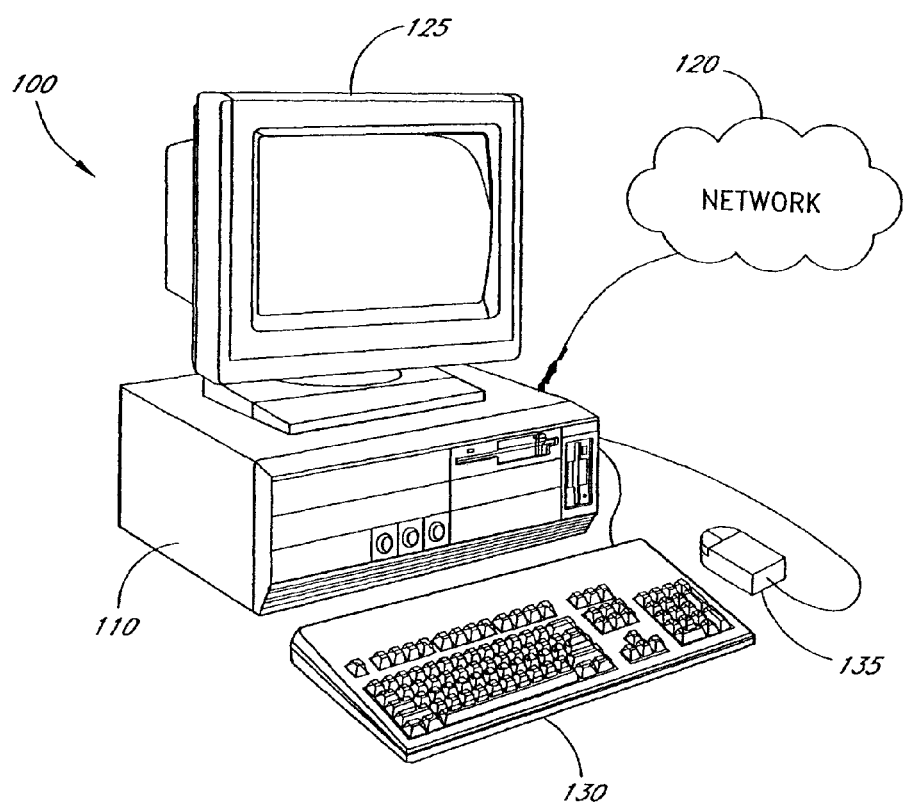
FIG. 1 is a diagram illustrating one example of a computer system for executing embodiments of a rule-based terrain generation system.

The following detailed description of certain embodiments presents various descriptions of specific embodiments of the present invention. However, the present invention can be embodied in a multitude of different ways as defined and covered by the claims. In this description, reference is made to the drawings wherein like parts are designated with like numerals throughout.

In one embodiment, a terrain generation system includes a system and method for procedurally generating terrain geometry data from terrain rules. The rules are also referred to herein as affectors. By describing the terrain procedurally with rules rather than storing actual terrain geometry data, a drastic savings in terms of memory and disk space is achieved by generating the terrain on the fly in real time when it is necessary. The terrain generation system modifies, for example, terrain height, color, shaders and textures, flora, and environment. In addition, by generating terrain procedurally, the terrain generation system can generate and render practically limitless detail by changing the parameters used to create the terrain geometry. These parameters, which can also be referred to as terrain rules, can be added and removed dynamically, leading to modification of the terrain in real time.

In some embodiments, the default terrain size is 16 kilometers by 16 kilometers. Terrains can be as small as 1 kilometer by 1 kilometer in size, and could be even larger than 16 kilometers by 16 kilometers. In certain embodiments of the client-side terrain generation system, the terrain generation system can account for a full time of day cycle, including day, night, suns, moons, stars, and other celestial objects. However, the environment, weather effects, or lighting conditions are often not the same across an entire planet. For example, jungle regions generally appear crowded and dimly lit, and swampy areas appear to be foggy. Environment blocks refer to user-defined regions of the terrain that can change, for example, lighting, fog, and backdrop parameters. In certain embodiments of the terrain generation system, the transition between environment blocks can simply be changed over time.

The rules in the terrain generation system are also referred to as affectors, and are organized into layers. Boundaries refer to terrain designer- or artist-defined regions of virtual terrain for which the desired rules have effect. Filters refer to conditions to be considered when applying affectors. Layers can be arranged in a hierarchy with a parent-child or tree-leaf relationship. Examples of boundaries include circles, rectangles, and polygons. Examples of filters include filtering by slope, height, shader, direction and fractal. Examples of affectors include those that affect height, color, shader, flora, and radial flora. Boundaries, filters and layers are described in greater detail below.

The layer hierarchy of rules allows the rules to overlap. In order to minimize or prevent hard, visible discontinuities when the rules overlap, the terrain generator can feather boundary edges and filters. Feathering is a way of specifying a blend region and the operations to blend heights and colors.

The terrain generation system also includes families, which refer to groups of assets such as textures, geometry or even algorithms. Families can include children with weights. This could involve choosing an asset by selecting a one weighted child. For example, this could allow the users to choose a "grass" family for a region, but when the terrain system generates the grass family, it can choose one of the children of the grass family, which results in the rendering of a single grass shader.

Examples of families include shader families, blend families, flora families, radial flora families, and fractal families. Shader families refer to grouping shaders for placing textures. Blend families refer to grouping shaders for selecting alpha blend masks. Flora families refer to grouping geometry for selecting flora. Radial flora families refer to grouping shaders for placing radial flora. Fractal families refer to grouping fractals for reuse within different rules.

Boundaries, filters, and affectors can be defined in layers and sublayers, such that a single location in the terrain can have multiple terrain rules. A layer without boundaries (or filters) is "unbounded," and can affect as much as the entire landscape. A layer with a boundary allows the affectors in the layer and sublayers to be applied to the region specified by the boundary.

Examples of layers include the following:
1. Layer
   a. AffectorHeightConstant, 10
   b. AffectorShaderConstant, Rock
2. Layer
   a. BoundaryCircle, x=500, y=500, r=500, feather=InOut
   b. AffectorHeightConstant, 0
   c. AffectorShaderConstant, Mud
   d. Layer
      i. FilterHeight min=13, max=17
      ii. AffectorColorConstant, BLACK
3. Layer
   a. BoundaryRectangle, min=−500, −500, max=500, 500
   b. AffectorFloraStaticCollidableConstant, Conifer
   c. AffectorFloraDynamicNearConstant, Dead grass This example illustrates a textual representation of the rules, as opposed to actual code for the rules. In the layered rule example listed above, the various boundaries, filters and affectors can be assigned numeric values, or textual values (for example, "feather=InOut") that represent the desired attribute in a logical, textual format. In some embodiments, the textual values can be assigned to a specific numeric value at compilation time.

Using the example rules listed above, the corresponding rule description can perform the following: set the height of the terrain everywhere to 10 meters and assign the rock shader. Then, in a 500 meter circle originating from coordinates (500, 500), gradually decrease the height from 10 meters to 0 meters, place the mud shader, and create a black band where the height of the terrain at a given sample point is between 13 and 17 meters. Finally, in a rectangle from coordinates (−500, −500) to (500, 500), place conifer trees and dead grass within the rectangle.

The terrain generation system supports adding layers during run time to modify the terrain by adding or deleting rules. This can be used for such features as, for example, flattening terrain under a building while clearing it of any flora or radial flora, or cratering the terrain following an ion cannon blast from an orbiting space ship looming above in certain online games. Similarly, deleting a rule set removes any features that the rule set provides. For example, the user can remove a lake, move a lake, duplicate a lake, and the like.

As an example, to define a cliff in the terrain generation system, the user could create height rules that modify the height of one area of the terrain, for example, to be significantly lower than a neighboring area. With the terrain generation system using a regular grid for its height data, and if the heights of neighboring height poles differ too greatly, the terrain textures can appear to stretch across the polygons of the terrain. Such stretching can either be tolerated or corrected.

In massively multiplayer online computer games, an avatar refers to a graphical icon or image that represents a real person or character. For example, when the game player enters the game system, the player can often choose from a number of avatars. Sophisticated 3D avatars can even change shape depending on what they are presently doing, for example, walking, sitting, running, etc.

The terrain generation system can use one or more of the many graphics rendering hardware and conventions. One such graphics rendering platform is the industry standard DirectX® 9. The terrain generation system is layered on top of an existing 3D graphics engine and object system, which is layered on top of DirectX® 9.

The terrain generation system additionally includes real-time modification of the procedurally-generated terrain. By specifying certain region and deformation parameters, the terrain generation system can modify (or deform) the terrain in real time for various terrain features, such as craters and terrain flattening for houses or other buildings. For example, the terrain system was designed to handle the following needs of expansion: enlarging landmass, adding rules, adding planets, steep cliffs, level-of-detail popping, environment blocks, collidable flora, surface properties, static mesh addition, and resource placement.

The terrain generation system can additionally include defining rules for global water in the virtual world. Global water refers to a sheet of water at a specified height across the entire planet or terrain world. In some embodiments, global water is implemented as a single plane per chunk that is rendered with the chunk as the chunk is rendered. Global water can be used for oceans and the like. The water graphically undulates and is rendered with high-quality shader effects.

Surface terrain properties include tagging terrain tiles with game-specific data that affects what the player experiences. For example, tiles can be marked as slippery, damage inflicting, or impassable, to name just a few. With one shader per tile, surface properties can be associated per shader.

The terrain generation system additionally includes a system and method for placing flora objects in a terrain system. The fast flora placement ensures that the flora surrounding the current viewpoint is minimal, accurate, and detailed. Traditional methods generally pre-create all of the flora and use a render system or scene graph system culling to not render some of these objects, for example, those that are not visible due to occlusion from other closer objects. For example, some embodiments of the fast flora placement create terrain flora only where it is necessary.

Additionally, the terrain generation system includes a system and method for real-time road generation in the terrain. Procedural terrain generation can include creating earth-like geometry, such as mountains, valleys, rolling hills, and plains. Users defining data for a procedural terrain generation system sometimes want to create man-made terrain structures, such as roads. Users define road data for the terrain generation system by laying down control points influencing the road's path, assigning a road width, and assigning shaders to apply to the road terrain. The terrain generation system generates the terrain without the road, then modifies the terrain for the road, smooths the terrain along the road's width to keep the road flat, and attempts to minimize drastic changes in terrain slope along the road's length.

Still further, the terrain generation system includes a system and method for real-time river generation in the terrain. Procedural terrain generation can include creating earth-like geometry, such as mountains, valleys, rolling hills, and plains. Users defining data for a procedural terrain generation system may want to create flowing water systems, such as rivers. Users can define river data for the terrain generation system by laying down control points influencing the river's path, assigning a river width and depth, and assigning shaders to apply to the riverbed sides, the riverbed bottom, and the river water itself. The terrain generation system generates the terrain without the river, then modifies the terrain for the river, carves the terrain along its width and depth to form the river, and ensures that the water travels flat or down hill by eliminating any changes in terrain slope along the river's length that would otherwise force the water to travel in an upward direction.

Referring now to the figures, FIG. 1 is a diagram illustrating one example of a computer system 100 for executing embodiments of a rule-based terrain generation system. The computer system 100 includes at least one computing device 110, for example, a computer in the embodiment of FIG. 1. In embodiments in which the terrain generation system includes more than one computer system 100, the computer systems can be interconnected via a network 120, for example, a public network such as the Internet, to form a networked computing environment (see FIGS. 1A and 2).

Figure 3:
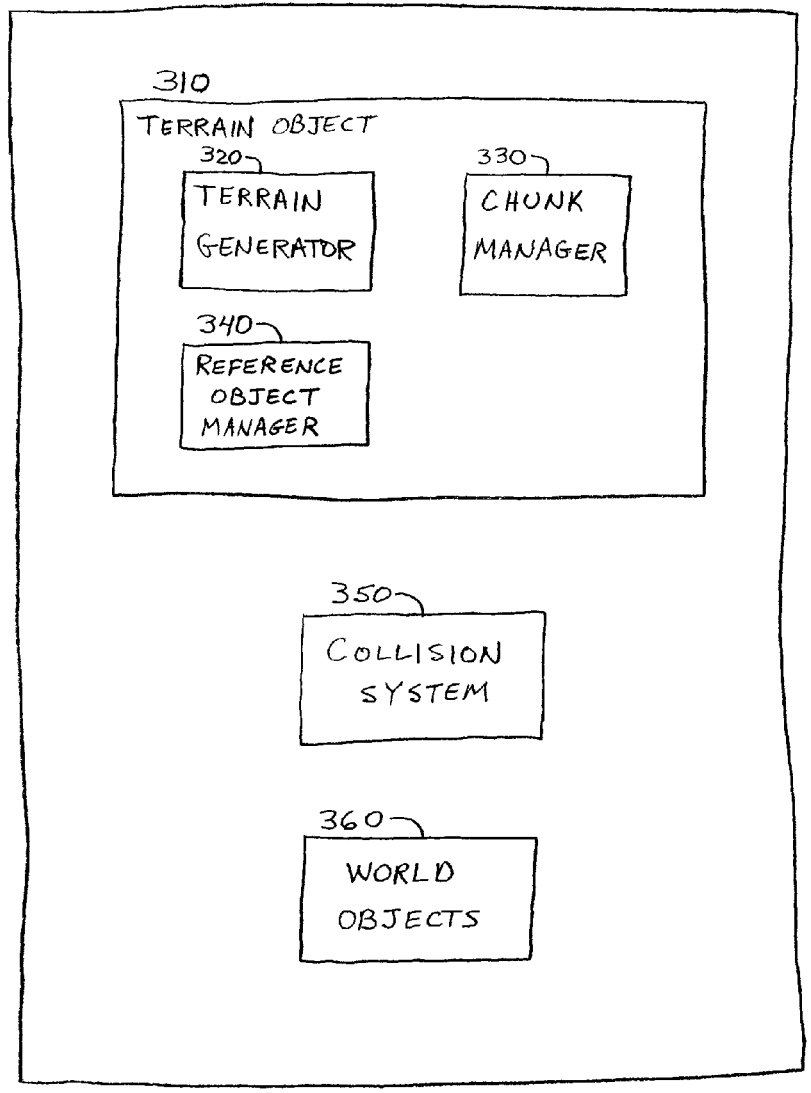
FIG. 3 is a block diagram illustrating an embodiment of server-side terrain system modules of the terrain generation system that can be executed on one or more of the various servers shown in FIGS. 1A and 2.
Figure 4:
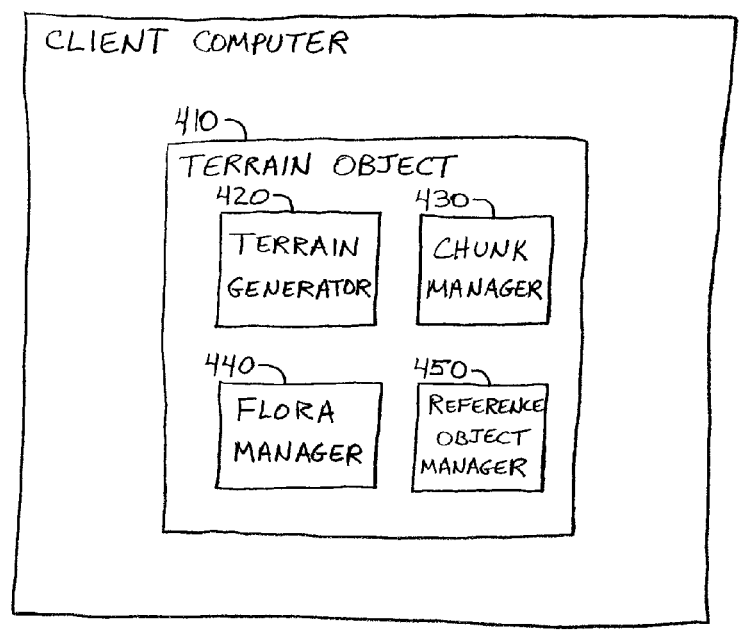
FIG. 4 is a block diagram illustrating an embodiment of client-side terrain system modules of the terrain generation system that can be executed on one or more of the various client computers shown in FIGS. 1A and 2.

The computing device 110 in FIG. 1 includes a microprocessor and other hardware for executing the terrain generation system modules (for example, see FIGS. 3 and 4). The microprocessor can be any conventional general purpose single- or multi-chip microprocessor, for example, a Pentium processor, a Pentium Pro processor, an 8051 processor, a MPS processor, a Power PC processor, or an ALPHA processor, just to name a few. In addition, the microprocessor can be any conventional special purpose microprocessor such as an Application-Specific Integrated Circuit (ASIC) processor.

The computing device 110 is connected to a display 125 and at least one input device. Using the input device and display 125, a user can provide user inputs to the terrain generation system. The input device may be a keyboard 130, a mouse 135, a rollerball (not shown), a pen and stylus (not shown), or a voice recognition system (not shown). The input device may also be a touch screen (not shown) associated with the display 125. Using a touch screen, the user can respond to prompts on the display or enter other user selections by touching certain areas of the display screen. In addition, textual data can be entered by the user through the input device. In other embodiments, the computing device 110 can be, for example, a personal digital assistant (PDA), cellular telephone, wireless computing device, laptop computer, set top box, and so forth.

The network 120 can include any type of electronically connected group of computing devices including, for instance, the following networks: Internet, Intranet, Local Area Network (LAN) or Wide Area Network (WAN). In addition, the connectivity to the network can be, for example, via remote modem, Ethernet (IEEE 802.3), Token Ring (IEEE 802.5), Fiber Distributed Datalink Interface (FDDI) or Asynchronous Transfer Mode (ATM). The networked computing devices can be desktop, server, portable, hand-held, set-top, or any other desired type of configuration. As used herein, an Internet network can include network variations such as public Internet, private Internet, and secure Internet. Furthermore, the network can be configured as a private network, a public network, a value-added network, an intranet, and the like.

Figure 1A:
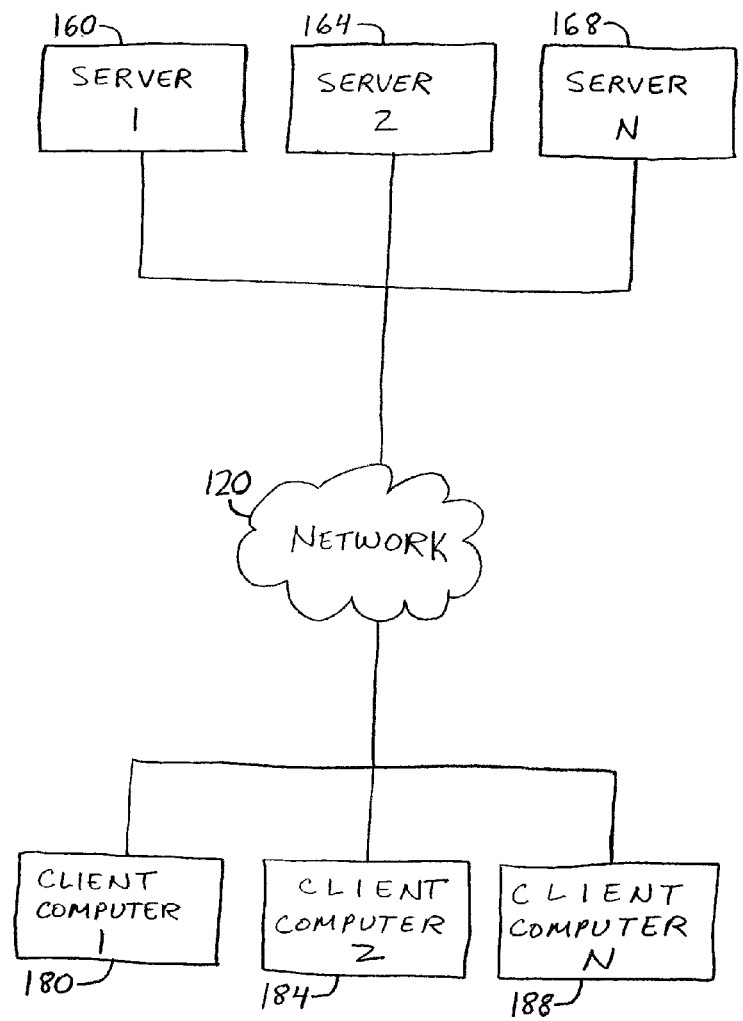
FIG. 1A is a block diagram illustrating one example of the terrain generation system network configuration.

FIG. 1A is a block diagram illustrating one example of the terrain generation system network configuration. As shown in FIG. 1, the terrain generation system can optionally include multiple computers connected via the network 120. The terrain generation system shown in FIG. 1A includes a server 1 160, a server 2 164, and a server N 168. Additional embodiments of the terrain generation system can include only one server computer, or any number of multiple servers as represented by the designation 'N' for the server N 168. The terrain generation system can additionally include a client computer 1 180, a client computer 2 184, and a client computer N 188. Similar to the server computers, additional embodiments of the terrain generation system can include only one client computer, or any number of multiple client computers as represented by the designation 'N' for the client computer N 188. The terms "client computer" and "user computer" are used interchangeably herein.

Figure 2:
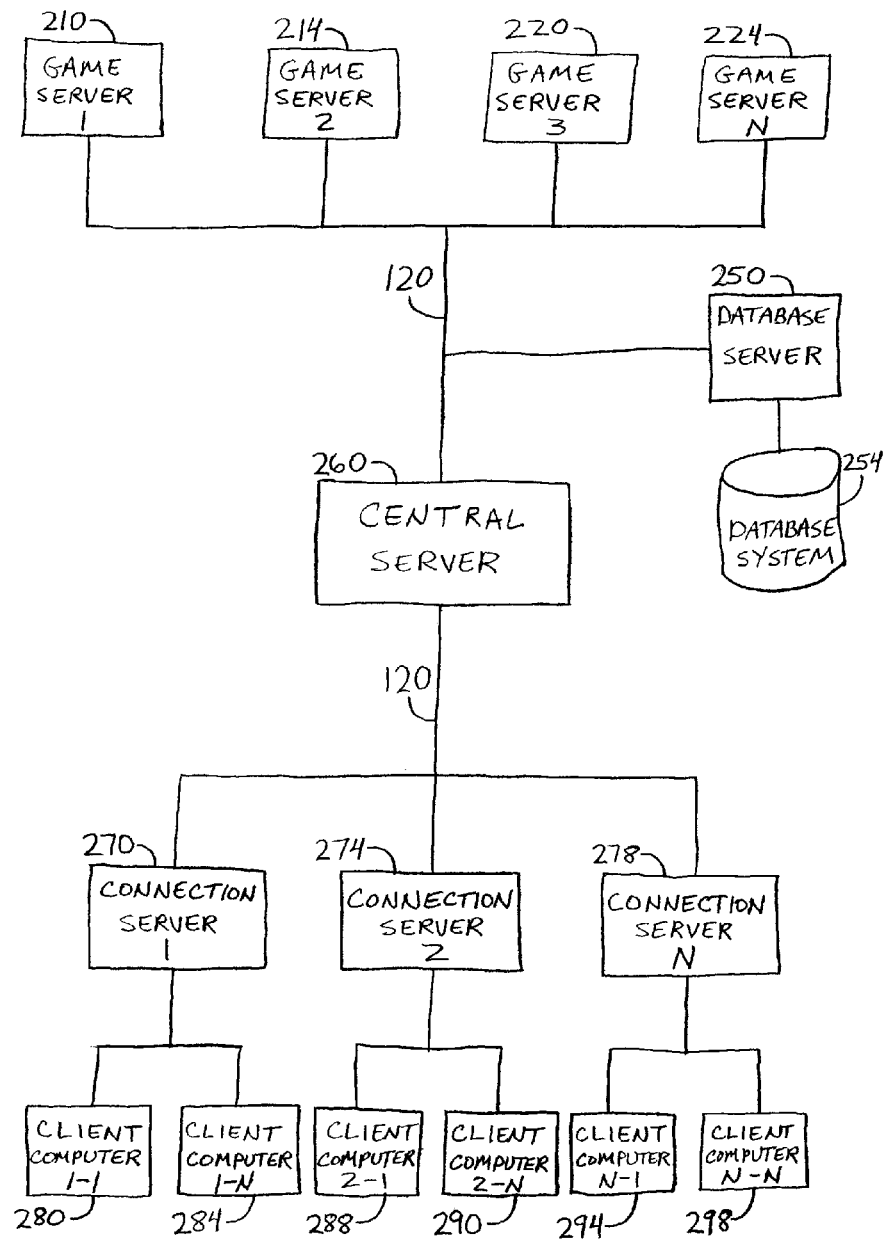
FIG. 2 is a block diagram illustrating an exemplary terrain generation system network configuration.

FIG. 2 is a block diagram illustrating an exemplary terrain generation system network configuration 200. The terrain generation system can include one or more server computers, one or more database storage systems, and one or more client computers. The example of the terrain generation system shown in FIG. 2 includes one or more game servers, designated as a game server 1 210, a game server 2 214, a game server 3 220, and a game server N 224 (collectively referred to as the game servers 210, 214, 220, 224). Each of the game servers 210, 214, 220, 224 generates the terrain data for pre-determined regions of the planet or world. The game servers 210, 214, 220, 224 are connected to a central server 260 via the network 120. A database server 250 can also be connected to the network 120 and to a database storage system 254 for storing, for example, object locations, player information, and other world information that is generated by modules of the terrain generation system executing on the game servers 210, 214, 220, 224. The processing on the central server 260 includes maintaining a list of the game servers 210, 214, 220, 224 that are connected, and communicating with the game servers 210, 214, 220, 224.

The terrain generation system shown in FIG. 2 additionally includes one or more connection servers, designated as a connection server 1 270, a connection server 2 274, and a connection server N 278 224 (collectively referred to as the connection servers 270, 274, 278). The terrain generation system also includes one or more client computers, designated as a client computer 1-1 280, a client computer 1-N 284, a client computer 2-1 288, a client computer 2-N 290, a client computer N-1 294, and a client computer N-N 298 (collectively referred to as the client computers 280, 284, 288, 290, 294, 298). Although FIG. 2 shows two client computers connected to each of the one or more connection servers 270, 274, 278, in other embodiments fewer or more than two client computers can be connected to each of the connection servers 270, 274, 278.

The central server 260 communicates with the connection servers 270, 274, 278 via the network 120. The connection servers 270, 274, 278, in addition to communicating with the central server 260, communicate with the one more client computers 280, 284, 288, 290, 294, 298 to which they are connected. The procedurally generated terrain is rendered (graphically displayed) on the client computers 280, 284, 288, 290, 294, 298.

FIG. 3 is a block diagram illustrating an embodiment of server-side terrain system modules 300 of the terrain generation system that can be executed on one or more of the various servers shown in FIGS. 1A and 2. The server-side terrain system modules 300 execute, for example, on the game servers 210, 214, 220, 224 shown in FIG. 2. The server-side terrain system modules 300 procedurally generate the terrain metadata for the regions of the planet or virtual world. The server-side terrain system modules 300 include a terrain object module 310, a collision system module 350, and a world objects module 360.

The terrain object module 310 includes a terrain generator module 320, a chunk manager module 330, and a reference object manager module 340. A chunk as described herein refers to a portion of the entire terrain for which terrain data is generated. In other words, the terrain landscape is logically divided into square pieces referred to as chunks. The geometry of the chunks is described below with regard to at least FIGS. 5-7. The chunk manager module 330 determines which chunks to generate terrain for. For example, the chunk manager module 330 can generate terrain for the chunks with moving objects in them, as well as adjacent chunks. The terrain generator module 320 generates terrain around the chunks identified by the chunk manager module 330 as described above. The reference object manager module 340 maintains the location and status of reference objects in the terrain generation system.

The collision system module 350 determines whether movable objects have collided with other objects in the terrain system. Having determined that a collision has occurred, the collision system module 350 determines whether the collision is with an object that is collidable or non-collidable. For example, some flora types (e.g., trees) are of a collidable type so that a movable object cannot move through the flora type. Other flora types (e.g., blades of grass) are of a non-collidable type that do not hinder or impede the movement of movable objects.

Collision determination in the terrain generation system is polygon accurate on both the client computer and the server. The collision determination supports collision tests with an arbitrary line. Since the terrain is organized in a quad tree, a sphere check is done on each node in the quad tree to decide if children should be tested. If the child is a leaf in the quad tree, the child includes actual geometry and each polygon is tested for collision with the line. The user can ask for both the collision point and terrain polygon normal. One optimal case for collision detection is asking for the height at a given (x,z) coordinate.

The flora features of some embodiments of the terrain generation system are integrated with the game's collision system to not allow the player to walk through large flora (trees, rocks, etc.). The users have the ability to specify which children in a flora family are collidable. It is assumed that radial flora is not collidable. The server also knows about collidable flora to validate movement and path find.

The world objects module 360 can maintain the location and status information for multiple non-terrain objects in the world. Examples of non-terrain objects include such objects as game characters or players (also referred to as avatars) in the multiplayer online game embodiments of the terrain generation system.

FIG. 4 is a block diagram illustrating an embodiment of client-side terrain system modules 400 of the terrain generation system that can be executed on one or more of the various client computers shown in FIGS. 1A and 2. The client-side terrain system modules 400 execute, for example, on the client computers 280, 284, 288, 290, 294, 298 shown in FIG. 2. The client-side terrain system modules 400 generate and render the terrain on the user's display screen. The client-side terrain system modules 400 include a terrain object module 410, which includes a terrain generator module 420, a chunk manager module 430, a flora manager 440, and a reference object manager 450.

The chunk manager module 430 determines for which chunks to generate the terrain. The chunk manager module 430 in the client-side terrain system modules 400 generates terrain from the current terrain viewpoint to the horizon. In some embodiments, the chunk manager module 430 can generate high level (detailed) terrain out to a certain distance, and generate less detailed terrain past that distance. The chunk manager module 430 can be configured to generate more detailed terrain out a greater distance on higher performance client computers 280, 284, 288, 290, 294, 298. Similarly, the chunk manager module 430 can be configured to generate high level terrain out a lesser distance on lower performance client computers 280, 284, 288, 290, 294, 298. The chunk manager module 430 on the client-side terrain system modules 400 sets up the chunk geometry as a quad tree to spatially subdivide the terrain into quadrants. The client-side chunk map is described in greater detail below.

The terrain generator module 420 generates terrain around the chunks identified by the chunk manager module 430 as described above. The flora manager module 440 calculates new flora position data based on updated reference object positions. The reference object manager module 450 maintains the location and status of reference objects in the terrain generation system.

Figure 5:
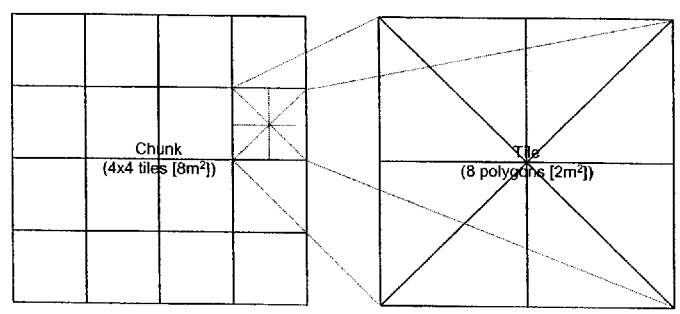
FIG. 5 is a diagram illustrating one example of the configuration of a terrain chunk in the terrain generation system as managed by the chunk manager module shown in FIGS. 2 and 4.

FIG. 5 is a diagram illustrating one example of the configuration of a terrain chunk 500 in the terrain generation system as managed by the chunk manager module shown in FIGS. 2 and 4. While chunks can be defined to be many different sizes and shapes, the embodiments described herein have square chunks with fixed width sides, for example, squares that are eight meters in length on each side. Similarly, each chunk can be subdivided in many different ways in different embodiments. For example, as shown in the example in FIG. 5, chunks can be subdivided into tiles that are two meter square tiles. The chunks can be further subdivided by subdividing the tiles, for example, into eight equally sized triangles, as also illustrated in FIG. 5. Therefore, in embodiments in which the entire terrain landscape is logically divided into square pieces called chunks, the terrain can be generated one chunk at a time.

The terrain generation system supports changing chunk or tile sizes. The chunk and tile size parameters can be set by the user when configuring the terrain data. To optimize performance of the terrain generation system on an exemplary computer system, eight meter chunks with two-by-two tile geometries can be chosen. However, many other chunk and tile sizes and geometries could also be used, for example, based on the type of computer system or operating system used. It is also possible to increase the chunk and tile size values as more powerful hardware is developed and utilized, resulting in an increased visual quality, which can also be used to keep the game visually competitive for a significant amount of time after product launch. The client can also display terrain at a higher resolution than the server.

Figure 6:
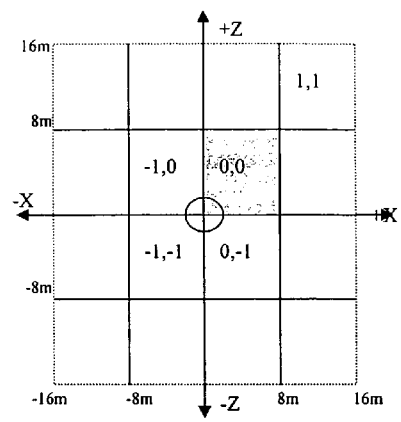
FIG. 6 is a diagram illustrating an example of the world coordinates of multiple adjacent terrain chunks as shown in FIG. 5.

FIG. 6 is a diagram illustrating an example of the world coordinates of multiple adjacent terrain chunks as shown in FIG. 5. In some embodiments, the world coordinate of each chunk is determined by the location of the lower left-hand corner of the chunk. In embodiments of the terrain generation system, the terrain chunks have coordinates in chunk space. Any world coordinate can be hashed, or converted, into chunk space, and world space coordinates for any terrain chunk can be calculated with the chunk coordinates and the chunk width. A spatial database (or even a map) can store the chunk along with a unique chunk identifier. In some embodiments, the unique chunk identifier can be created by hashing the chunk x coordinate in the high word of a double word memory location, and the chunk z coordinate in the low word of the double word. To determine if a chunk exists, the chunk identifier can be searched for in the spatial database.

As shown in the example of FIG. 6, chunk space coordinates (0,0) define a world space chunk within world positions (0 meters,0 meters) and (8 meters,8 meters). Translating a world space position to chunk space can be accomplished by dividing each coordinate by the chunk width. If the coordinate was originally less than zero, 1 is subtracted from the resulting chunk space coordinate. As an example, (100,100) in world space translates to 100/8=12, or (12,12) in chunk space. Similarly, (−100,−100) in world space translates to −100/8=−12−1=−13, or (−13,−13) in chunk space.

Figure 7:
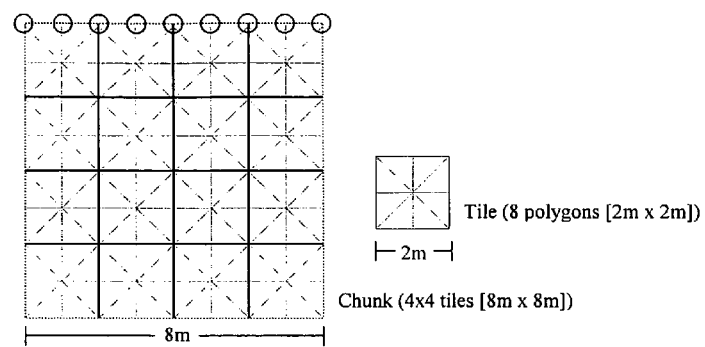
FIG. 7 is a diagram illustrating an example of the decomposition of an entire terrain chunk into multiple tiles and triangles for the chunks as shown in FIGS. 5 and 6.

FIG. 7 is a diagram illustrating an example of the decomposition of an entire terrain chunk into multiple tiles and triangles for the chunks as shown in FIGS. 5 and 6. As described above, in some embodiments each chunk is an eight meter by eight meter section of sixteen tiles. A tile is a two meter by two meter section of eight triangles, with each triangle having a width and a length of 1m. By splitting the chunk into triangles in this way, grid sample points can be located every one meter. Thus, each chunk has nine by nine sample points, for a total of 81 sample points. These sample points represent the per-pixel values of the generated buffers.

In some embodiments, the terrain generation system determines the level of detail at which terrain is to be generated. For each chunk of terrain, which can be different sizes, the terrain generation system provides a certain amount of data, generally the size of the chunk and the buffers to fill, to the terrain generator. The terrain generator runs the buffers through the rules and outputs bitmaps which are then used to create the real 3 D geometry for the terrain. This geometry is added to a quad tree, for which the seams between detail levels can be stitched. In addition, blend shaders can be created.

Figure 8:
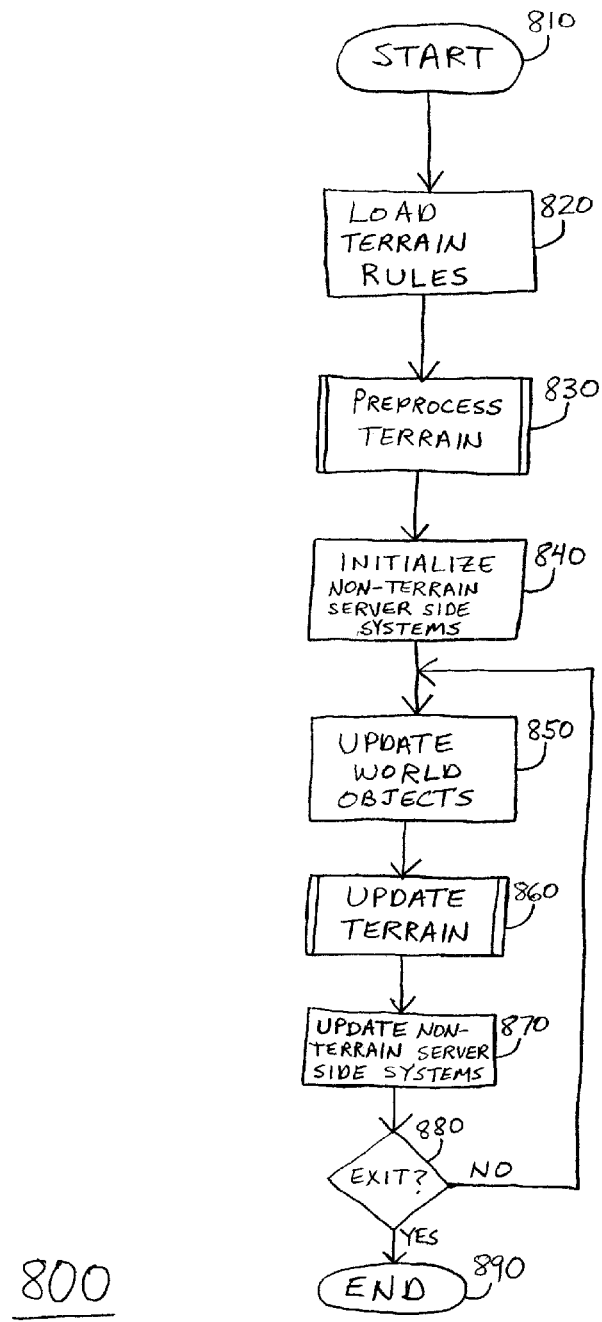
FIG. 8 is a flowchart illustrating an embodiment of a top-level execution process of the server-side system of the terrain generation system as executed by the server-side terrain system modules shown in FIG. 3.

FIG. 8 is a flowchart illustrating an embodiment of a top-level execution process 800 of the server-side system of the terrain generation system as executed by the server-side terrain system modules shown in FIG. 3. In some embodiments, the top-level execution process 800 can be executed by the terrain object 310 of the server-side terrain system modules 300 (see FIG. 3), or more specifically, by the terrain generator 320 of the terrain object 310. Depending on the embodiment, the ordering of the states in FIG. 8 can be re-arranged, additional states can be added, and others can be omitted.

The top-level execution process 800 includes a start state 810. The top-level execution process 800 continues to a load terrain state 820 for loading the rules and metadata that has been defined and saved for the particular terrain being generated. The top-level execution process 800 continues to a preprocess terrain state 830 for performing various preprocessing operations on the terrain data. The preprocessing operations can include, for example, preprocessing road segment data and river segment data, and creating flora list data. The preprocess terrain state 830 operations are described in more detail below with regard to FIG. 24.

The top-level execution process 800 continues to a state 840 to initialize non-terrain server side systems. At a state 850, the top-level execution process 800 updates world objects, for example, game characters, buildings, ships, and the like. The update of world objects includes updating the position of movable objects and updating the status of objects. The top-level execution process 800 continues to an update terrain state 860, which is further shown in at least FIGS. 10-18 and described in greater detail below with regard to these figures.

The top-level execution process 800 continues to a state 870 to update non-terrain server side systems. At a decision state 880, the top-level execution process 800 determines whether to exit the game, for example, based on user selection, or continue the main server side processing loop. If it is determined at the state 880 to remain in the loop (not exit), the top-level execution process 800 continues back to the state 850 to update world objects as described above. Alternatively, if it is determined at the state 880 to exit the loop, the top-level execution process 800 continues to an end state 890. The top-level execution process 800 terminates at the end state 890.

Figure 9:
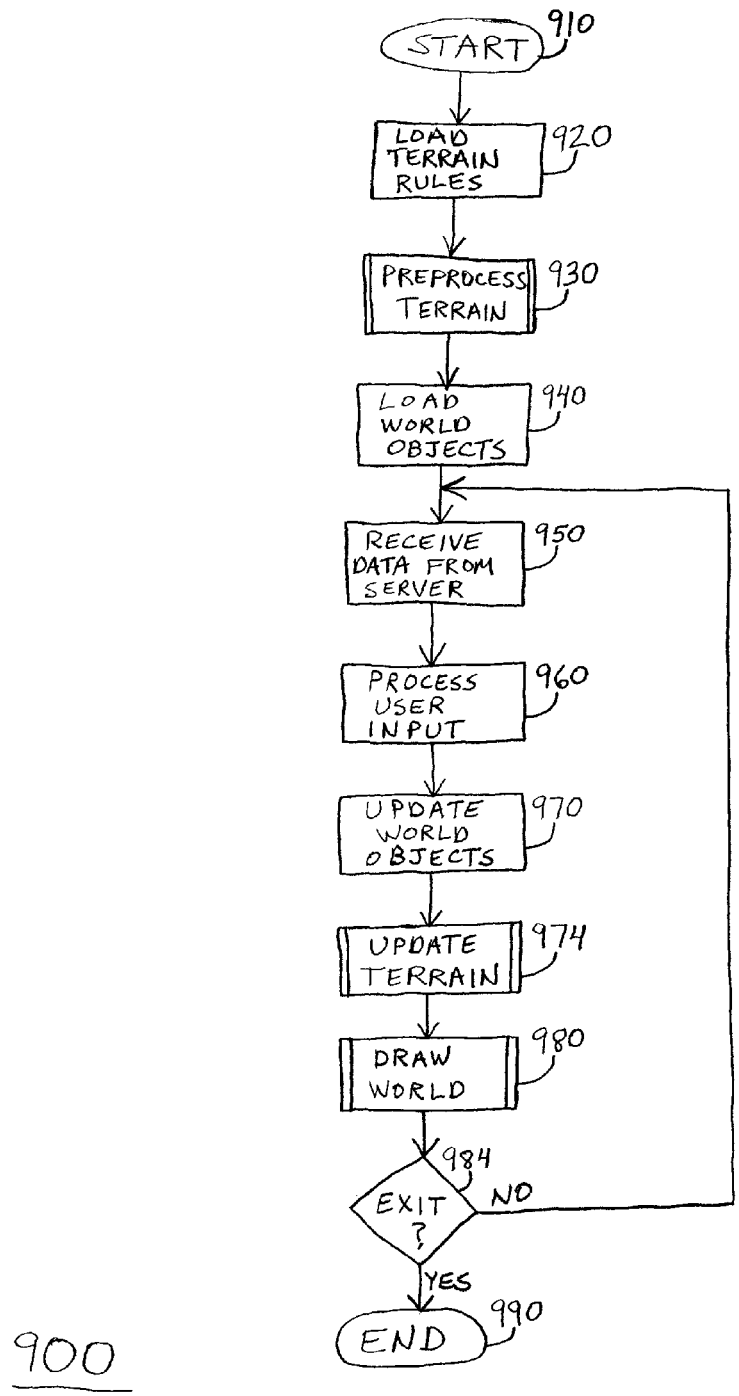
FIG. 9 is a flowchart illustrating an embodiment of a top-level execution process of the client-side system of the terrain generation system as executed by the client-side terrain system modules shown in FIG. 4.

FIG. 9 is a flowchart illustrating an embodiment of a top-level execution process 900 of the client-side system of the terrain generation system as executed by the client-side terrain system modules shown in FIG. 4. In some embodiments, the top-level execution process 900 can be executed by the terrain object 410 of the client-side terrain system modules 400 (see FIG. 4), or more specifically, by the terrain generator 420 of the terrain object 410. Depending on the embodiment, the ordering of the states in FIG. 9 can be re-arranged, additional states can be added, and others can be omitted.

The top-level execution process 900 begins at a start state 910. The top-level execution process 900 continues to a load terrain state 920 for loading the rules and metadata that has been defined and saved for the particular terrain being generated. The top-level execution process 900 continues to a preprocess terrain state 930 for performing various preprocessing operations on the terrain data. The preprocessing operations can include, for example, preprocessing road segment data and river segment data, and creating flora list data. The preprocess terrain state 930 operations are described in more detail below with regard to FIG. 10.

The top-level execution process 900 continues to a state 940 to load world objects to an initial position or state in the virtual world. At a state 950, the top-level execution process 900 receives data from one or more of the servers shown in FIGS. 1A and 2 regarding objects or terrain updates. The top-level execution process 900 continues to a state 960 to process user input. User input at the client computer can include requests by the user to enter or exit the game, to move their character in a specified direction, or to fire at another character, to name just a few.

At a state 970, the top-level execution process 900 updates world objects, for example, game characters, buildings, ships, and the like. The update of world objects includes updating the position of movable objects and updating the status of objects. The top-level execution process 900 continues to an update terrain state 974, which is further shown in at least FIGS. 10-18 and described in greater detail below with regard to these figures.

The top-level execution process 900 continues to a state 980 to actually draw (render) the world, including objects and terrain. The operations of the draw world state 980 are described in greater detail below with regard to FIG. 20. At a decision state 984, the top-level execution process 900 determines whether to exit or continue the main client side processing loop. If it is determined at the state 984 to remain in the loop (not exit), the top-level execution process 900 continues back to the state 950 to receive data from the server(s) as described above. If it is determined at the state 984 to exit the loop, the top-level execution process 900 continues to an end state 990. The top-level execution process 800 terminates at the end state 990.

Figure 10:
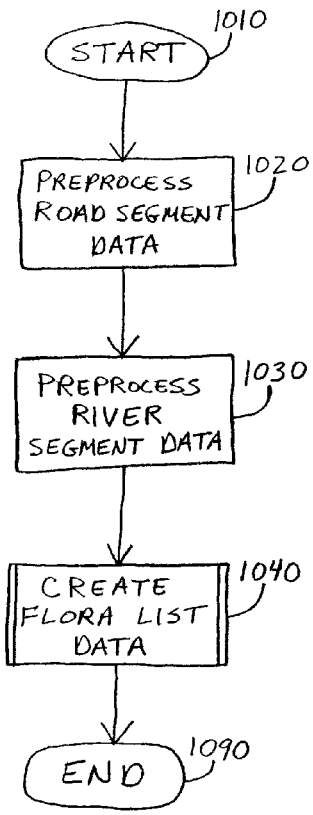
FIG. 10 is a flowchart illustrating an embodiment of a preprocess terrain process of the top-level execution process of the server-side system shown in FIG. 8.

FIG. 10 is a flowchart illustrating an embodiment of a preprocess terrain process 830 of the top-level execution process of the server-side system shown in FIG. 8. Depending on the embodiment, the ordering of the states in FIG. 10 can be re-arranged, additional states can be added, and others can be omitted.

The preprocess terrain process 830 begins at a start state 1010. The preprocess terrain process 830 continues to a state 1020 to preprocess road segment data. The preprocessing of road segment data at the state 1020 includes determining the coordinates of the road points based on the road segment, for example, a connected series of line segments that define the path of the road, and the road width. The process of real-time road generation is described in greater detail below with regard to FIG. 23.

At a state 1030, the preprocess terrain process 830 preprocesses river segment data. The preprocessing of river segment data at the state 1030 is similar to the road preprocessing at the state 1020 as described above. However, since rivers cannot travel uphill the way roads can, river preprocessing at the state 1030 cuts into the existing terrain as necessary to insure that the river only flows in a level or downhill direction. In addition, the river preprocessing at the state 1030 includes adding a trench depth into the existing terrain since rivers, unlike roads, have a depth into the terrain that defines the depth of the river.

The preprocess terrain process 830 continues to a state 1040 to create flora list data. Flora types can include collidable and non-collidable flora, based on whether movable objects such as characters can move through the flora or must move around the flora. Flora management and placement is described below with regard to FIGS. 21 and 22. The preprocess terrain process 830 continues to an end state 1090. The preprocess terrain process 830 terminates at the end state 1090.

Figure 11:
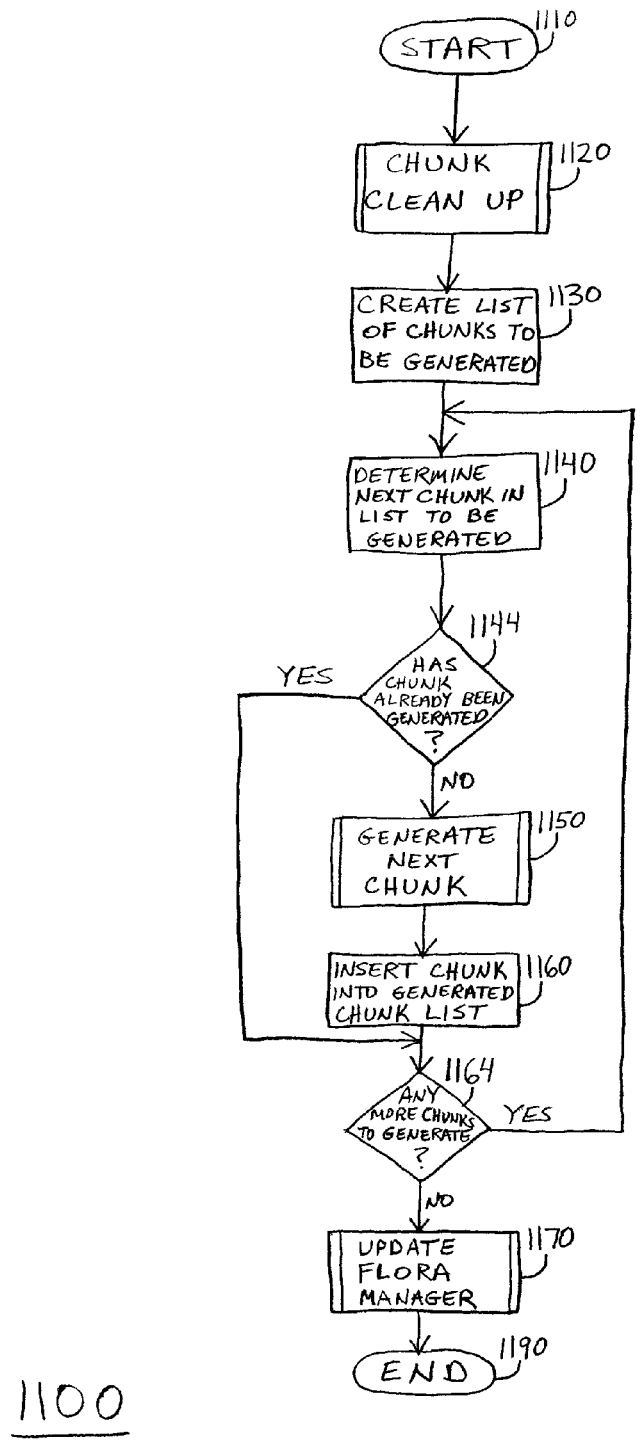
FIG. 11 is a flowchart illustrating an embodiment of a terrain generation process of the terrain generation system.

FIG. 11 is a flowchart illustrating an embodiment of a terrain generation process 1100 of the terrain generation system. The terrain generation process 1100 determines chunk generation, for example, based on object location, and manages a list with the chunks that have been generated. In some embodiments, the terrain generation process 1100 is performed by one or more of the terrain generator 320 and chunk manager 330 (see FIG. 3). Depending on the embodiment, the ordering of the states in FIG. 11 can be re-arranged, additional states can be added, and others can be omitted.

The terrain generation process 1100 begins at a start state 1110. The terrain generation process 1100 continues to a state 1120 to perform chunk cleanup processing. The chunk cleanup processing at the state 1120 includes determining if the number of chunks generated exceeds a threshold value, deleting chunks based on an assigned priority level for each chunk, and returning the chunk memory to the terrain generation system. The chunk cleanup processing at the state 1120 is described in more detail below with regard to FIG. 18.

At a state 1130, the terrain generation process 1100 creates a list of chunks to be generated based on object locations. For example, in some embodiments, the terrain generation process 1100 generates chunks under each movable object that is defined in the virtual world. Thus, as an object moves from one chunk to another, the chunk is generated if it has not already been generated. In this way, chunks are generated where they are needed but not generated elsewhere, resulting in superior performance due to avoiding generation of unneeded chunks.

The terrain generation process 1100 continues to a state 1140 to determine the next chunk in the chunk list to be generated. At a decision state 1144, the terrain generation process 1100 determines if the chunk to be generated has already been generated. If the terrain generation process 1100 determines at the decision state 1144 that the chunk has not already been generated, a state 1150 generates the next chunk in the list. The next chunk generation process at the state 1150 is described in more detail below with regard to FIG. 12. The terrain generation process 1100 continues to a state 1160 to insert the generated chunk into the generated chunk list for tracking and managing the generated chunks.

The terrain generation process 1100 continues to a decision state 1164 to determine whether any more chunks are to be generated. If it is determined at the decision state 1144 that the chunk has already been generated, the terrain generation process 1100 continues to the decision state 1164. If it is determined at the decision state 1164 that more chunks are to be generated, the terrain generation process 1100 continues back to the state 1140 to determine the next chunk in the list to be generated. If, however, the terrain generation process 1100 determines at the decision state 1164 that more chunks are not to be generated, a flora manager update process is performed at a state 1170. The flora manager update process at the state 1170 determines a new position of the flora based on a difference between reference object positions. The flora manager update process at the state 1170 is described in more detail below with regard to FIG. 19. The terrain generation process 1100 continues to an end state 1190. The terrain generation process 1100 terminates at the end state 1190.

Figure 12:
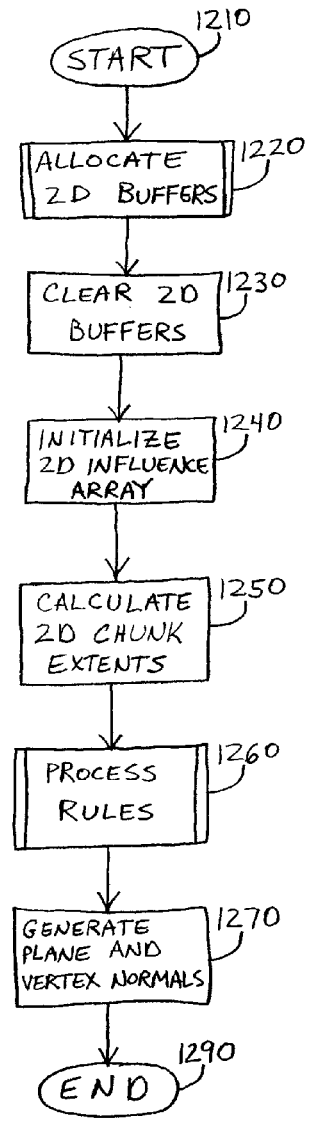
FIG. 12 is a flowchart illustrating an embodiment of a chunk generation process of the terrain generation process shown in FIG. 11.

FIG. 12 is a flowchart illustrating an embodiment of a chunk generation process 1150 of the terrain generation process 1100 shown in FIG. 11. In some embodiments, the chunk generation process 1150 is performed by the chunk manager module 330 of the terrain object 310 (see FIG. 3). In other embodiments, the chunk generation process 1150 can be moved to other modules of the terrain generation system. Depending on the embodiment, the ordering of the states in FIG. 12 can be re-arranged, additional states can be added, and others can be omitted.

The chunk generation process 1150 begins at a start state 1210. The chunk generation process 1150 continues to a state 1220 to allocate two-dimensional (2 D) buffers either from memory buffers that were returned when other chunks were deleted or allocated from the operating system. The operation of the 2 D buffer allocation state 1220 is described in more detail below with regard to FIG. 13.

At a state 1230, the chunk generation process 1150 clears the 2 D buffers that were allocated in the state 1220 as described above. For example, values for height, color, flora and environment can be cleared at the state 1230. The chunk generation process 1150 continues to a state 1240 to initialize the 2 D influence array. The 2 D influence array is used to determine to what extent the rules have an effect on, for example, filters or boundaries. The chunk generation process 1150 continues to a state 1250 to calculate the 2 D chunk extents. The 2 D chunk extents indicate the distances of the four edges of the chunk from the world origin based on the chunk world coordinates and the chunk width.

The chunk generation process 1150 continues to a state 1260 to process the rules for the chunk being generated. The operation of the process rules state 1260 is described in greater detail below with regard to FIG. 14. At a state 1270, the chunk generation process 1150 generates the plane and vertex normals. A surface normal is computed for every triangle represented and a vertex normal is computed for every sample point represented in FIG. 7. This data is useful for both collision detection and lighting computations when rendering the terrain. The chunk generation process 1150 continues to an end state 1290. The chunk generation process 1150 terminates at the end state 1290.

Figure 13:
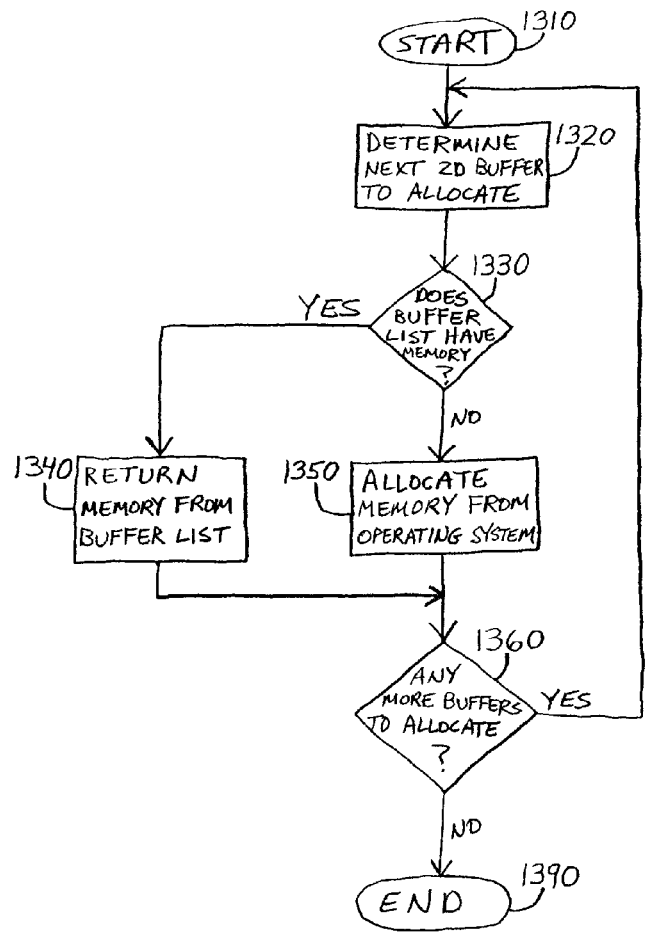
FIG. 13 is a flowchart illustrating an embodiment of the allocate 2 D buffer process of the generate chunk process shown in FIG. 12.

FIG. 13 is a flowchart illustrating an embodiment of the allocate 2 D buffer process 1220 of the generate chunk process 1150 shown in FIG. 12. The terrain generation system is configured to cache and reuse memory on the client computer. Memory for chunk data can be reused when chunks are added and removed. Shaders are reference counted and reused if they have already been constructed. Depending on the embodiment, the ordering of the states in FIG. 13 can be re-arranged, additional states can be added, and others can be omitted.

In some embodiments, chunk memory is allocated either from memory that has been returned to the terrain generation system from the deletion of existing chunks, or directly from the operation system. As allocation of memory from the operating system is more time consuming than reusing memory from deleted chunks, such embodiments of the allocate 2 D buffer process 1220 reuse memory whenever possible as described below.

The allocate 2 D buffer process 1220 begins at a start state 1310. The allocate 2 D buffer process 1220 continues to a state 1320 to determine the next 2 D buffer to allocate. The allocate 2 D buffer process 1220 continues to a decision state 1330 to determine if the buffer list has unused memory available that was already allocated from the operating system. Memory that is already allocated but presently unused is allocated if available as this consumes fewer system resources than allocating additional memory from the operating system. If it is determined at the decision state 1330 that the buffer list does have unused memory available, the allocate 2 D buffer process 1220 continues to a state 1340 to return the unused memory from the buffer list for the new 2 D buffer.

Alternatively, if it is determined at the decision state 1330 that the buffer list does not have unused memory available, the allocate 2 D buffer process 1220 continues to a state 1350 to allocate the memory for the 2 D buffer from the operating system. The allocate 2 D buffer process 1220 continues to a decision state 1360 to determine whether there are any more 2 D buffers for which to allocate memory. If it is determined at the decision state 1360 that there are more 2 D buffers to be allocated, the allocate 2 D buffer process 1220 continues to the state 1320 to determine the next 2 D buffer to allocate. Alternatively, if it is determined at the decision state 1360 that there are not more 2 D buffers to be allocated, the allocate 2 D buffer process 1220 continues to an end state 1390. The allocate 2 D buffer process 1220 terminates at the end state 1390.

Figure 14:
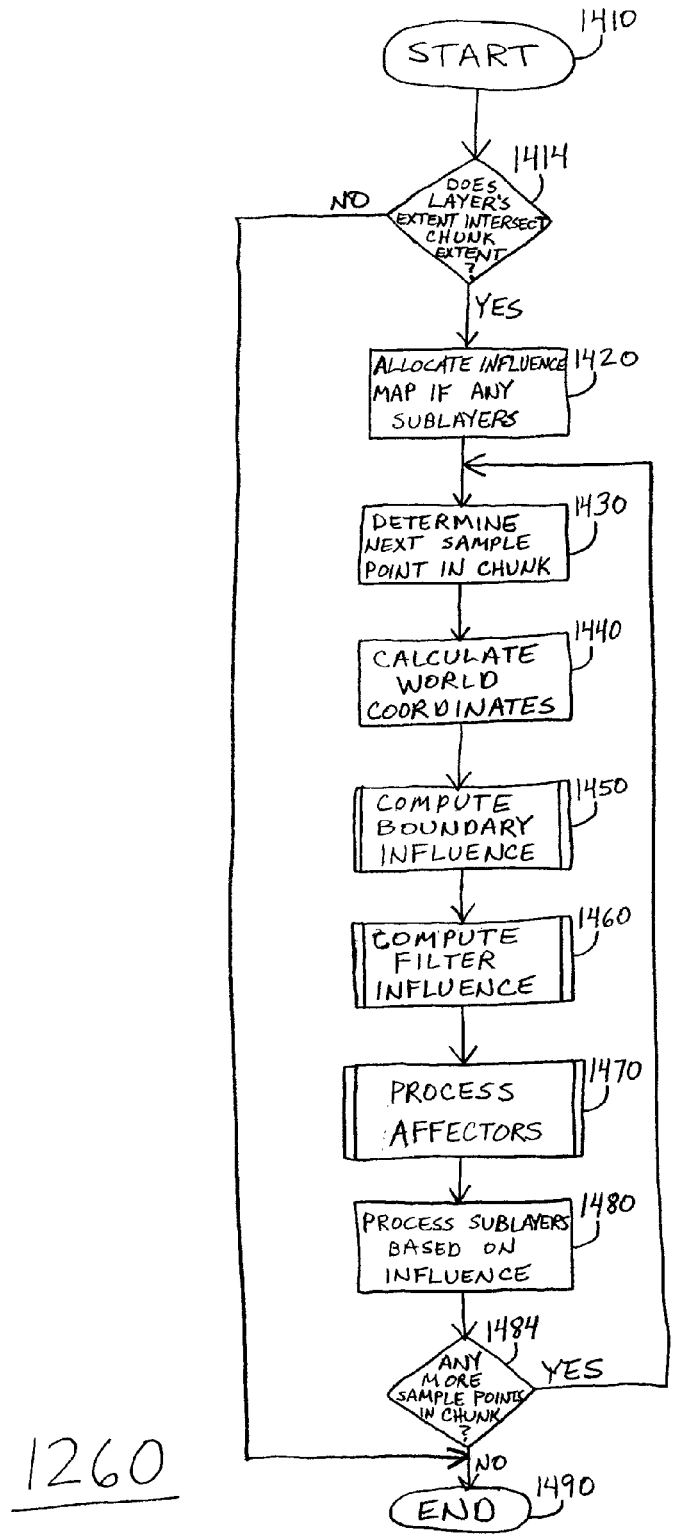
FIG. 14 is a flowchart illustrating an embodiment of a rules processing process of the chunk generation process as shown in FIG. 12.

FIG. 14 is a flowchart illustrating an embodiment of a rules processing process 1260 of the chunk generation process 1150 as shown in FIG. 12. The terrain generation system procedurally defines the terrain with rules (also referred to herein as affectors) rather than storing the actual geometry data. The terrain generation system generates the terrain on the fly in real time, and allows modification of such parameters as terrain height, color, shaders, textures, flora and environment. Additionally, generating the terrain procedurally allows for almost limit-less detail by changing the parameters used to create the terrain geometry. These rules can also be added and removed dynamically leading to terrain modification in real time. The rules can affect such parameters as boundaries, filters, height, color, shader, flora and other miscellaneous parameters. Depending on the embodiment, the ordering of the states in FIG. 14 can be re-arranged, additional states can be added, and others can be omitted.

The rules processing process 1260 begins at a start state 1410. The rules processing process 1260 continues to a decision state 1414 to determine whether the layer's extent intersects the chunk extent for the rule being processed. If it is determined at the decision state 1414 that the layer's extent does intersect the chunk extent, the rules processing process 1260 continues to a state 1420 to allocate the influence map if any sublayers are present. At a state 1430, the rules processing process 1260 determines the next sample point in the chunk for the rule being processed. The rules processing process 1260 continues to a state 1440 for calculating the world coordinates from the chunk coordinates for the next sample point in the chunk.

At a state 1450, the rules processing process 1260 computes the boundary influence of the rule at the current sample point. As described above, boundaries refer to terrain designer- or artist-defined regions for which the desired rules have effect. Layers can be arranged in a hierarchy with a parent-child relationship. Example boundaries include circles, rectangles, and polygons. The layers in the terrain generation system enable rules to overlap, and in order to minimize or avoid hard, visible discontinuities at the overlapping regions, the terrain generation system can feather boundary edges and filters. Feathering is a manner of specifically blending regions, including the blending of heights and colors at overlapping regions. The operations of the state 1450 for computing the boundary influence are described below with regard to FIG. 15.

The rules processing process 1260 continues to a state 1460 for computing the filter influence of the rule at the current sample point. Filters refer to conditions to be considered when applying affectors. Example filters include filtering by slope, height, shader, direction or fractal. The patterns that the fractal system produces can be used by the resource system to populate the planet with resources. The users can configure fractal parameters per region for the allocation of resources. Example affectors include those that affect height, color, shader, flora, and radial flora.

The operations of the state 1460 for computing the filter influence are described below with regard to FIG. 16. The rules processing process 1260 continues to a state 1470 for processing the affectors at the current sample point. The operations of the state 1470 for processing the affectors are described below with regard to FIG. 17.

At a state 1480, the rules processing process 1260 processes sublayers based on the influences computed at the state 1450, the state 1460 and the state 1470. The rules processing process 1260 continues at a decision state 1484 to determine whether there are any more sample points in the chunk to process. If it is determined at the state 1484 that there are more sample points, the rules processing process 1260 continues back to the state 1430 to determine the next sample point in the chunk as described above. However, if it is determined at the state 1484 that there are not more sample points in the chunk, the rules processing process 1260 continues to an end state 1490. In addition, at the decision state 1414, if it is determined that the layer's extent does not intersect chunk extent, the rules processing process 1260 continues to the end state 1490. The rules processing process 1260 terminates at the end state 1490.

Figure 15:
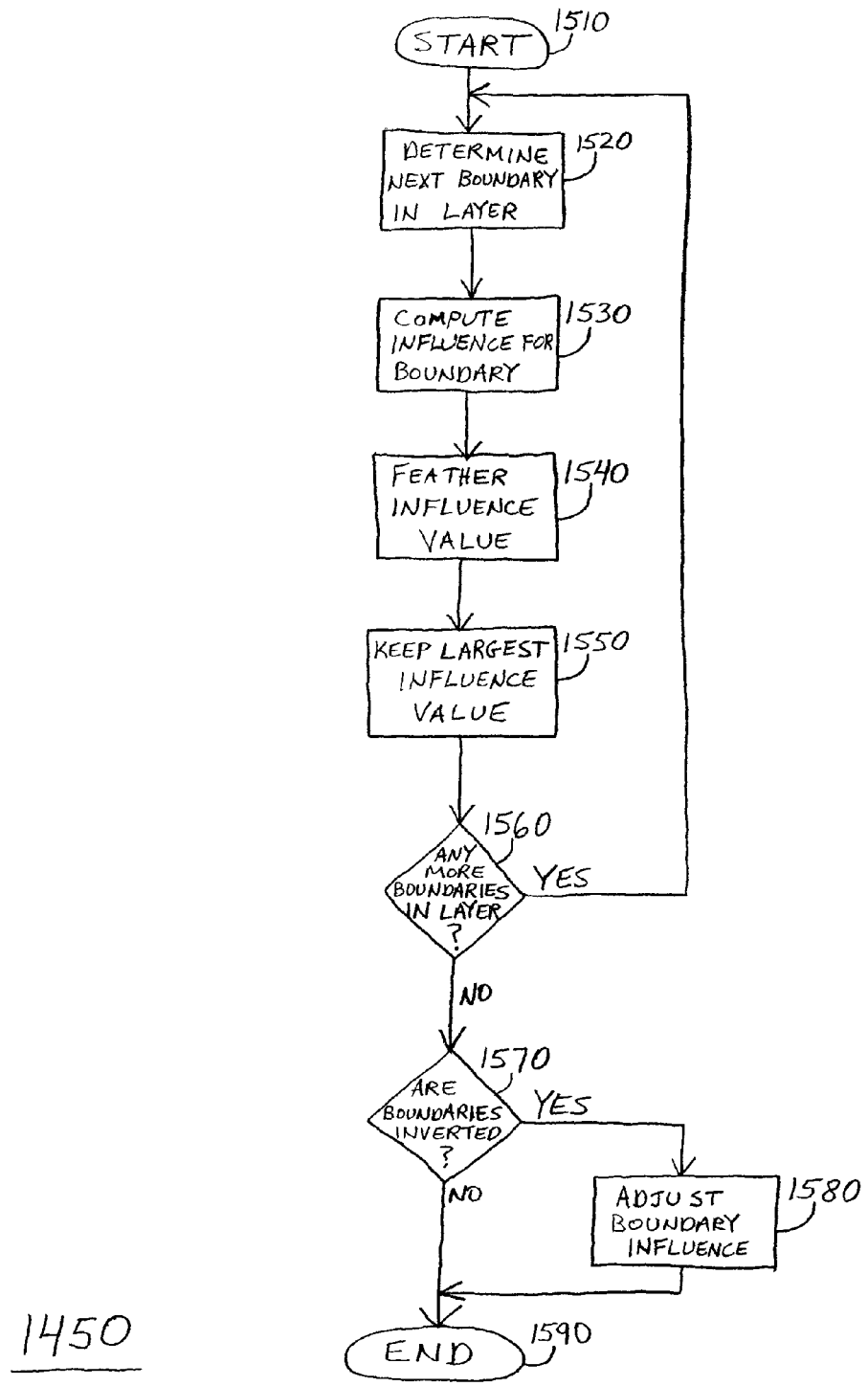
FIG. 15 is a flowchart illustrating an embodiment of a boundary influence computation process of the rules processing process shown in FIG. 14.

FIG. 15 is a flowchart illustrating an embodiment of a boundary influence computation process 1450 of the rules processing process 1260 shown in FIG. 14. The layering of the rules allows rules to overlap, and in order to minimize or prevent hard, visible discontinuities when they do, the terrain generator can feather boundary edges. Feathering is a way of specifying a blend region and the operations to blend heights and colors. Depending on the embodiment, the ordering of the states in FIG. 15 can be re-arranged, additional states can be added, and others can be omitted.

The boundary influence computation process 1450 begins at a start state 1510. The boundary influence computation process 1450 continues to a state 1520 to determine the next boundary in the layer for the rule being processed. At a state 1530, the boundary influence computation process 1450 computes the influence for the next boundary in the layer as determined at the state 1520. The boundary influence computation process 1450 feathers the influence value at a state 1540. As described above, feathering is a way of specifying a blend region and the operations to blend heights and colors to prevent hard, visible discontinuities at the overlap of terrain rules.

The boundary influence computation process 1450 continues at a state 1550 to keep the largest influence value. Since the boundary influence is to apply if the terrain point is in any of the overlapping boundary regions, the largest influence value is kept. At a decision state 1560, the boundary influence computation process 1450 determines whether there are any more boundaries in the layer for processing. If it is determined at the decision state 1560 that there are more boundaries, the boundary influence computation process 1450 continues back to the state 1520 to determine the next boundary in the layer. However, if it is determined at the decision state 1560 that there are not more boundaries, the boundary influence computation process 1450 continues to a decision state 1570 to determine whether the boundaries are inverted.

If it is determined at the decision state 1570 that the boundaries are inverted, the boundary influence computation process 1450 continues to a state 1580 to adjust the boundary influence so the boundaries are no longer inverted. However, if it is determined at the decision state 1570 that the boundaries are not inverted, or after the state 1580, the boundary influence computation process 1450 continues to an end state 1590. The boundary influence computation process 1450 terminates at the end state 1590.

Figure 16:
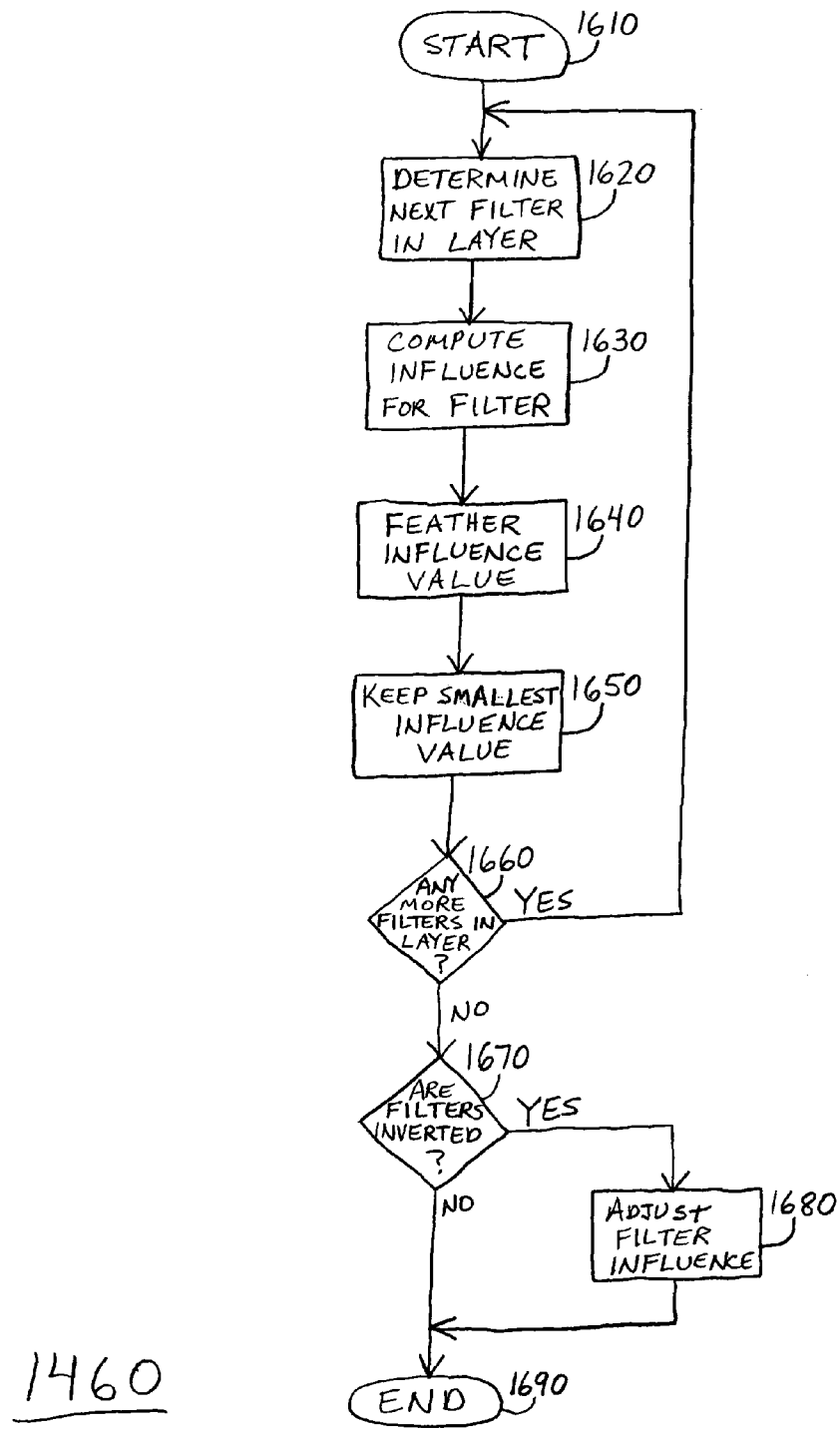
FIG. 16 is a flowchart illustrating an embodiment of a filter influence computation process of the rules processing process shown in FIG. 14.

FIG. 16 is a flowchart illustrating an embodiment of a filter influence computation process 1460 of the rules processing process 1260 shown in FIG. 14. The layering of the filter rules enables the rules to overlap one another, and in order to minimize or prevent hard, visible discontinuities at the points where they overlap, the terrain generator can feather filter rules. Depending on the embodiment, the ordering of the states in FIG. 16 can be re-arranged, additional states can be added, and others can be omitted.

The filter influence computation process 1460 begins at a start state 1610. The filter influence computation process 1460 continues to a state 1620 to determine the next filter in the layer for the rule being processed. At a state 1630, the filter influence computation process 1460 computes the influence for the next filter in the layer as determined at the state 1620. The filter influence computation process 1460 feathers the influence value at a state 1640. As described above, feathering is a way of specifying a blend region and the operations to blend heights and colors to prevent hard, visible discontinuities at the overlap of terrain rules.

The filter influence computation process 1460 continues at a state 1650 to keep the smallest influence value. Since the filter condition is to apply if the terrain point satisfies all of the defined overlapping filter regions, the smallest influence value is kept. At a decision state 1660, the filter influence computation process 1460 determines whether there are any more filters in the layer for processing. If it is determined at the decision state 1660 that there are more filters, the filter influence computation process 1460 continues back to the state 1620 to determine the next filter in the layer. However, if it is determined at the decision state 1660 that there are not more filters, the filter influence computation process 1460 continues to a decision state 1670 to determine whether the filters are inverted.

If it is determined at the decision state 1670 that the filters are inverted, the filter influence computation process 1460 continues to a state 1680 to adjust the filter influence so the filters are no longer inverted. However, if it is determined at the decision state 1670 that the filters are not inverted, or after the state 1680, the filter influence computation process 1460 continues to an end state 1690. The filter influence computation process 1460 terminates at the end state 1690.

Figure 17:
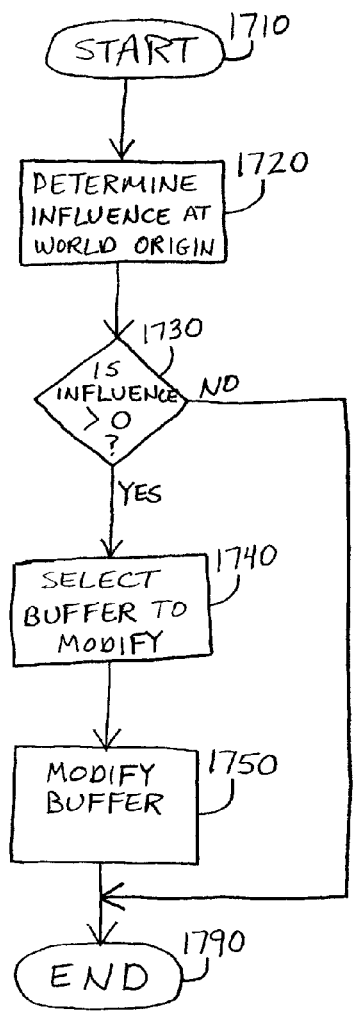
FIG. 17 is a flowchart illustrating an embodiment of an affectors processing process of the rules processing process shown in FIG. 14.

FIG. 17 is a flowchart illustrating an embodiment of an affectors processing process 1470 of the rules processing process 1260 shown in FIG. 14. The rules in the terrain generation system are also referred to as affectors, which can be organized into layers. Examples of affectors include rules that affect height, color, shader, flora, and radial flora. Depending on the embodiment, the ordering of the states in FIG. 17 can be re-arranged, additional states can be added, and others can be omitted.

The affectors processing process 1470 begins at a start state 1710. The affectors processing process 1470 continues to a state 1720 to determine the influence at the world origin. At a decision state 1730, the affectors processing process 1470 determines whether the influence determined at the state 1720 is greater than zero. If it is determined at the decision state 1730 that the influence is greater than zero, the affectors processing process 1470 continues to a state 1740 to select the terrain buffer to modify.

At a state 1750, the affectors processing process 1470 modifies the 2 D terrain buffers as selected at the state 1740. As one example, for a rule that affects the terrain height, the terrain height is computed for the given influence and written to the 2 D height buffer. If the color buffer is also to be modified, a new color is computed for the given influence and written to the color buffer. After the modify buffer state 1750, or if it is determined at the decision state 1730 that the influence is not greater that zero, the affectors processing process 1470 continues to an end state 1790. The affectors processing process 1470 terminates at the end state 1790.

Figure 18:
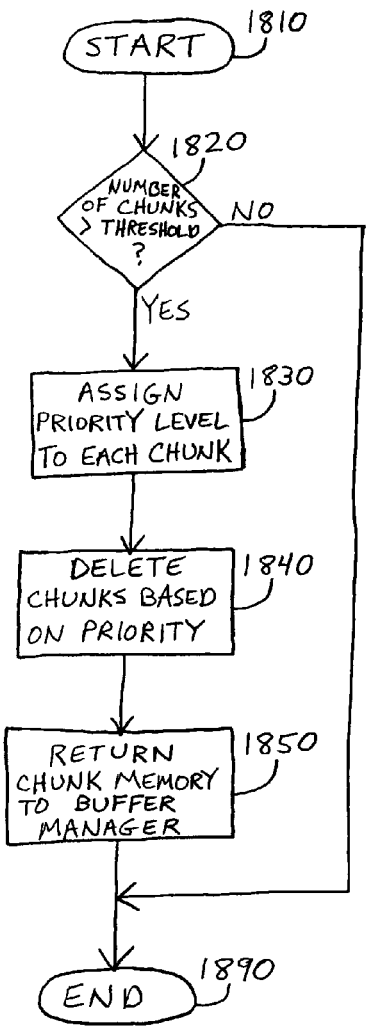
FIG. 18 is a flowchart illustrating an embodiment of a chunk clean-up process of the terrain generation process as executed by the chunk manager module on the server side or the chunk manager module on the client side.

FIG. 18 is a flowchart illustrating an embodiment of a chunk clean-up process 1120 of the terrain generation process 1100 as executed by the chunk manager module 330 on the server side or the chunk manager module 430 on the client side. The number of terrain chunks that can be generated at any given time is limited by system resources such as available system memory. When the number of chunks exceeds the chunk limit, chunks are deleted based on priority as described below. Depending on the embodiment, the ordering of the states in FIG. 18 can be re-arranged, additional states can be added, and others can be omitted.

The chunk clean-up process 1120 begins at a start state 1810. The chunk clean-up process 1120 continues to a decision state 1820 to determine whether the number of chunks is greater than a threshold value. The threshold value of chunks can be modified to be a number that is appropriate for the system configuration of the server or client computer. For example, the threshold value can be increased for systems having larger amounts of computer memory, or decreased for systems having smaller amounts of computer memory.

If it is determined at the decision state 1820 that the number of chunks is greater than the threshold value, the chunk clean-up process 1120 continues to a state 1830 to assign a priority level to each chunk. In some embodiments, the chunk priority levels include high priority, medium priority, medium-low priority, and low priority. High priority chunks are those chunks under a moving object, so that terrain is generated under moving objects as they move around the planet. Medium priority chunks are those chunks adjacent to a chunk under a moving object and in the direction the object is presently moving. Medium-low priority chunks are those chunks adjacent to a chunk under a moving object and in the opposite direction the object is presently moving. Low priority chunks are those chunks that are not under a moving object and not adjacent to a chunk under a moving object. In other embodiments, other priority levels and schemes can be utilized, as well as other criteria for determining the priority than those described above.

At a state 1840, the chunk clean-up process 1120 deletes chunks based on the priority level. In some embodiments, the chunk clean-up process 1120 deletes enough chunks so that the number of chunks remaining is equal to the chunk threshold value. Alternatively, the chunk clean-up process 1120 can delete enough chunks so that the number of chunks remaining is some amount less than the chunk threshold value so there is a certain number of additional new chunks that can be generated before additional chunks need to be deleted.

At a state 1850, the chunk clean-up process 1120 returns chunk memory to the buffer manager for either saving for reuse in newly generated chunks or returning to the operating system for further memory allocation. As described above with regard to FIG. 13, memory allocations from the operating system take longer than reusing already allocated memory for new chunks. After the state 1850, or if it is determined at the decision state 1820 that the number of chunks is not greater than the threshold value, the chunk clean-up process 1120 continues to an end state 1890. The chunk clean-up process 1120 terminates at the end state 1890.

Figure 19:
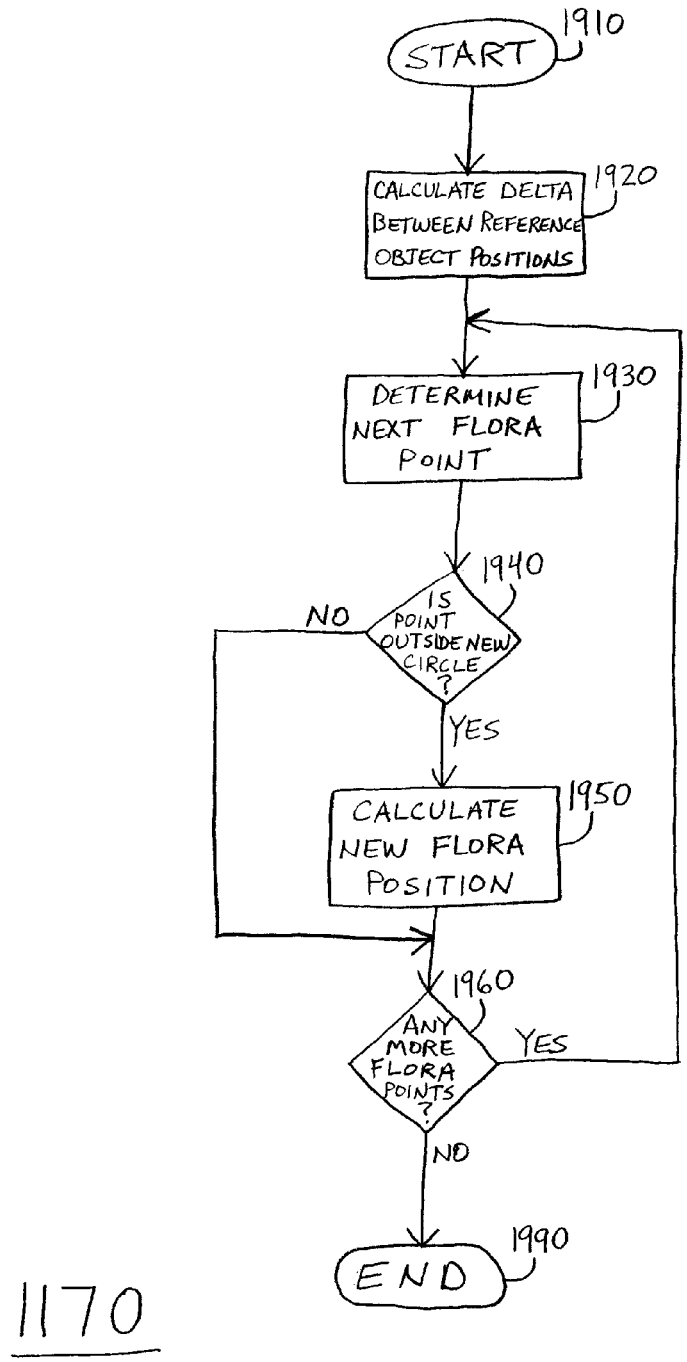
FIG. 19 is a flowchart illustrating an embodiment of a flora manager update process of the terrain generation process shown in FIG. 11 as executed by the flora manager module.

FIG. 19 is a flowchart illustrating an embodiment of a flora manager update process 1170 of the terrain generation process 1100 shown in FIG. 11 as executed by the flora manager module 440. Depending on the embodiment, the ordering of the states in FIG. 19 can be re-arranged, additional states can be added, and others can be omitted.

The flora feature of the terrain generation system includes a fix-sized sphere of world-space points that move with the player. For example, when a flora point falls out of the sphere, it can be mirrored on the other side and assigned parameters from the terrain generator's radial flora map, which specifies data per tile. The flora feature can also handle seeded arrangements of physical geometry that constitute the terrain designer's or artist's desire to plant "planned flora arrangements." Since the flora is real geometry, umbra can be used to mark flora as an occluder or have flora be occluded.

The radial flora feature of the terrain generation system includes a fix-sized sphere of world-space points that move with the player. Similar to flora points as described above, when a redial flora point falls out of the sphere, it can be mirrored on the other side and assigned parameters from the terrain generator's radial flora map, which specifies data per tile. The radial flora can be sorted into buffers for rendering per shader. Within the shader, radial flora can be sorted back to front for correct alpha sorting. An optimization to the current radial flora feature could entail packing several pieces of flora onto a single shader.

The flora manager update process 1170 begins at a start state 1910. The flora manager update process 1170 continues to a state 1920 to calculate the delta (difference) between reference object positions. For example, the delta can be the distance that a certain moving object has moved since the last time the object's position was checked and stored. The flora manager update process 1170 continues to a state 1930 to determine the next flora point to position and render the flora. In some embodiments, certain types of flora are only displayed within a given distance or radius around a moving object.

At a decision state 1940, the flora manager update process 1170 determines whether the next flora point is outside the new circle around the updated position of the moving object. If it is determined at the decision state 1940 that the point is outside the new circle, the flora manager update process 1170 continues to a state 1950 to calculate the new flora position based on the object's new position in the world. After the state 1950, or if it is determined at the decision state 1940 that the next point is not outside the new circle, the flora manager update process 1170 continues to a decision state 1960 to determine whether there are any more flora points to process.

If it is determined at the decision state 1960 that there are more flora points to process, the flora manager update process 1170 continues back to the state 1930 to determine the next flora point. However, if it is determined at the decision state 1960 that there are not any more flora points to process, the flora manager update process 1170 continues to an end state 1990. The flora manager update process 1170 terminates at the end state 1990.

Figure 20:
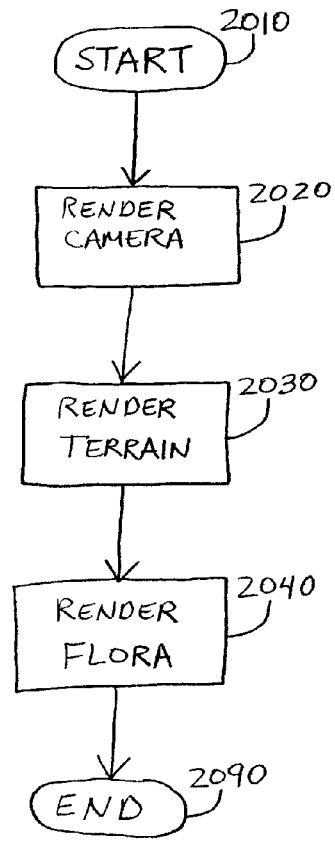
FIG. 20 is a flowchart illustrating an embodiment of a world draw process of the top-level execution process as shown in FIG. 9.

FIG. 20 is a flowchart illustrating an embodiment of a world draw process 980 of the top-level execution process 900 as shown in FIG. 9. The world draw process 980 graphically renders the terrain for the virtual world on the display screen of the client computer. Depending on the embodiment, the ordering of the states in FIG. 20 can be re-arranged, additional states can be added, and others can be omitted.

The world draw process 980 begins at a start state 2010. The world draw process 980 continues to a state 2020 to submit other non-terrain-related objects for rendering to the graphics system, such as other avatars in the virtual world. The world draw process 980 continues at a state 2030 to graphically render the terrain as generated by the procedural terrain generation system. At a state 2040, the world draw process 980 renders the flora as determined by the flora manager update process 1170 as described above with regard to FIG. 19. The world draw process 980 continues to an end state 2090. The world draw process 980 terminates at the end state 2090.

Figure 21:
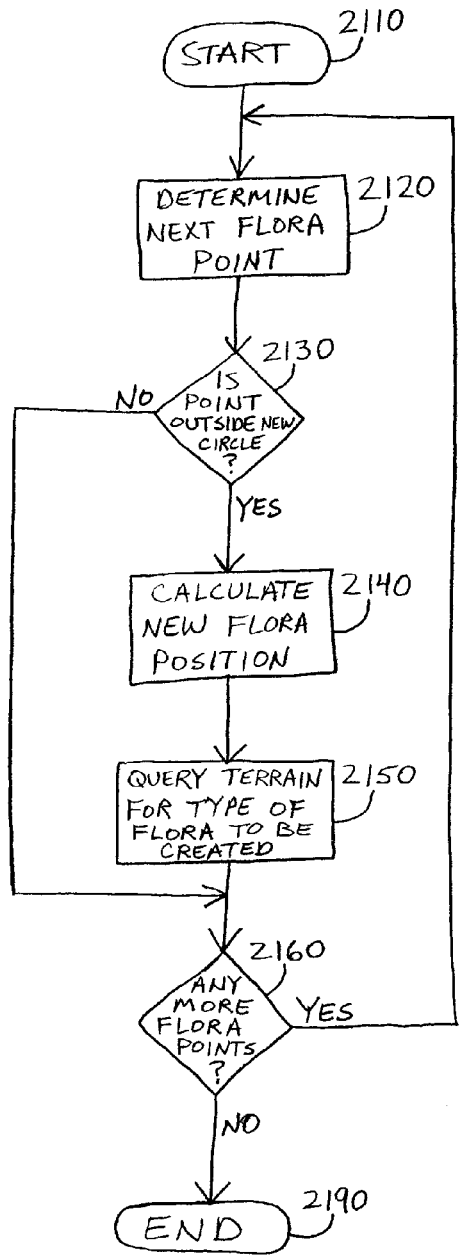
FIG. 21 is a flowchart illustrating an embodiment of a fast flora placement process of the terrain generation system.

FIG. 21 is a flowchart illustrating an embodiment of a fast flora placement process 2100 of the terrain generation system. The fast flora placement process 2100 generates flora surrounding the current viewpoint that is minimal, accurate, and detailed. For example, the fast flora placement process 2100 generates terrain flora only where it is necessary. Depending on the embodiment, the ordering of the states in FIG. 21 can be re-arranged, additional states can be added, and others can be omitted.

The fast flora placement process 2100 begins at a start state 2110. The fast flora placement process 2100 continues to a state 2120 to determine the next flora point to position and render the flora. In some embodiments, certain types of flora are only displayed within a given distance or radius around a moving object. At a decision state 2130, the fast flora placement process 2100 determines whether the next flora point is outside the new circle around the updated position of the moving object. If it is determined at the decision state 2130 that the point is outside the new circle, the fast flora placement process 2100 continues to a state 2140 to calculate the new flora position based on the object's new position in the world. At a state 2150, the fast flora placement process 2100 queries the terrain for the type of flora to be created. Some examples of flora types are grasses, shrubs and trees. After the state 2150, or if it is determined at the decision state 2130 that the next point is not outside the new circle, the fast flora placement process 2100 continues to a decision state 2160 to determine whether there are any more flora points to process.

If it is determined at the decision state 2160 that there are more flora points to process, the fast flora placement process 2100 continues back to the state 2120 to determine the next flora point. However, if it is determined at the decision state 2160 that there are not any more flora points to process, the fast flora placement process 2100 continues to an end state 2190. The fast flora placement process 2100 terminates at the end state 2190.

Figure 22:
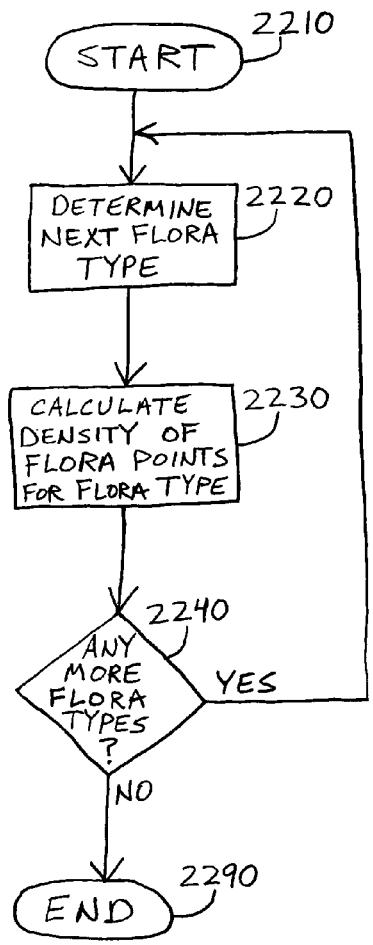
FIG. 22 is a flowchart illustrating an embodiment of a flora density calculation process of the terrain generation system.

FIG. 22 is a flowchart illustrating an embodiment of a create flora list process 1040 of the preprocess terrain process 930 shown in FIG. 10. Depending on the embodiment, the ordering of the states in FIG. 22 can be re-arranged, additional states can be added, and others can be omitted.

The create flora list process 1040 begins at a start state 2210. The create flora list process 1040 continues to a state 2220 to determine the next flora type in the flora list. At a state 2230, the create flora list process 1040 calculates the density of the flora points for the flora type. The create flora list process 1040 continues to a decision state 2240 to determine whether there are any more flora types in the list.

If it is determined at a decision state 2240 that there are more flora types in the list, the create flora list process 1040 continues back to the state 2220 to determine the next flora type. However, if it is determined at the decision state 2240 that there are not more flora types, the create flora list process 1040 continues to an end state 2290. The create flora list process 1040 terminates at the end state 2290.

Figure 23:
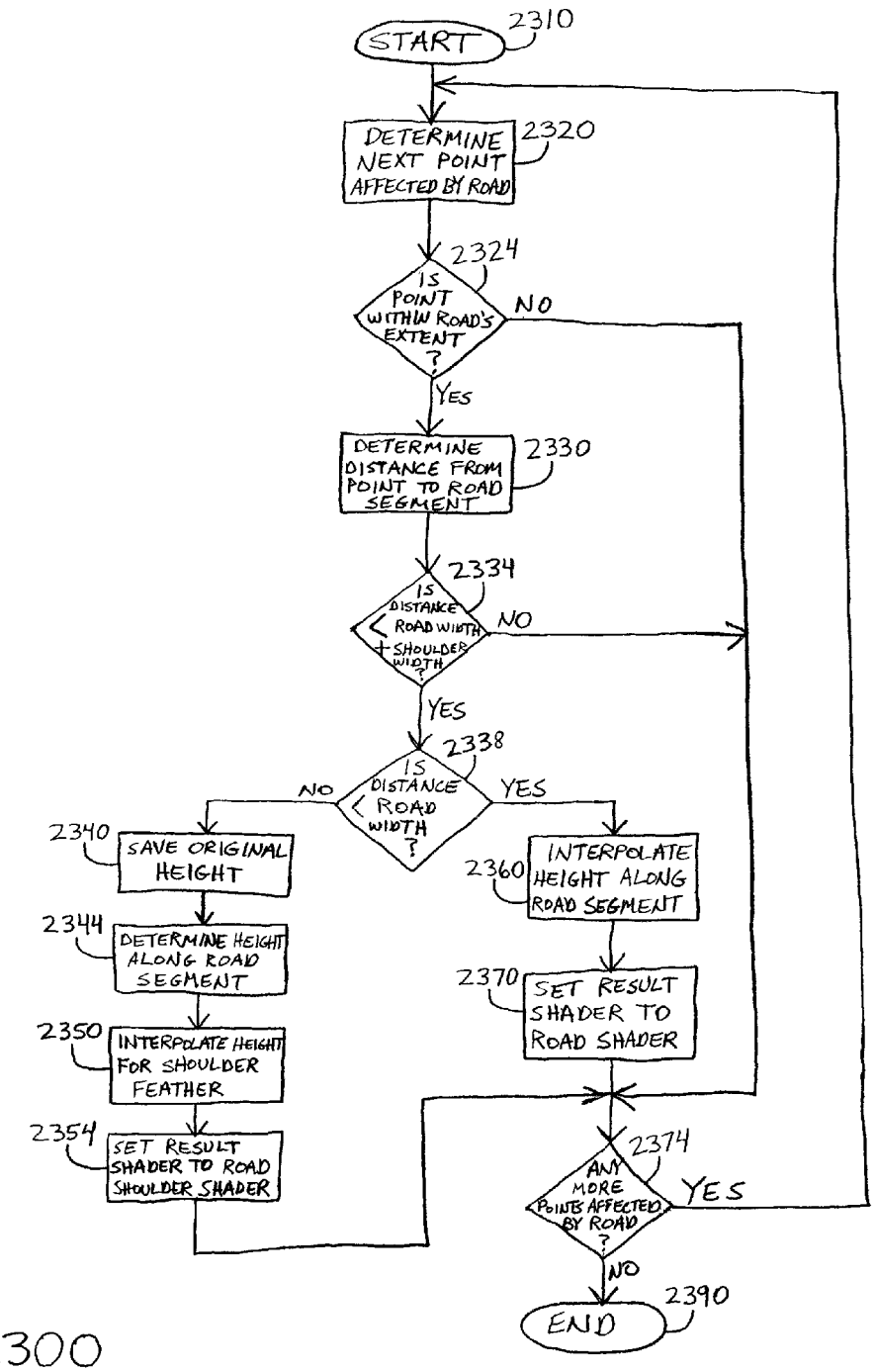
FIG. 23 is a flowchart illustrating an embodiment of a real-time road generation process of the terrain generation system.

FIG. 23 is a flowchart illustrating an embodiment of a real-time road generation process 2300 of the terrain generation system. To generate roads in the virtual world, the terrain generation system generates the underlying terrain without the road, then modifies the terrain for the road, smooths the terrain along the road's width to keep the road relatively flat, and attempts to minimize drastic changes in terrain slope along the road's length. Depending on the embodiment, the ordering of the states in FIG. 23 can be rearranged, additional states can be added, and others can be omitted.

In addition, the real-time road generation process 2300 includes shading and flattening the existing terrain, adding a shoulder to the road, and feathering (blending) the shoulder to the surrounding terrain so that the terrain transitions smoothly to the surrounding terrain instead of having a sharp contrast or discontinuity between the shoulder and bordering terrain.

The real-time road generation process 2300 begins at a start state 2310. The real-time road generation process 2300 continues to a state 2320 to determine the next point on the terrain affected by the road. At a decision state 2324, the real-time road generation process 2300 determines whether the next point is within the road's extent. In other words, the determination is made as to whether the point falls within the terrain points that are affected by the road. If it is determined that the point is within the road's extent, the real-time road generation process 2300 continues to a state 2330 to determine the distance from the point to the road segment, or the distance from the center of the road.

At a decision state 2334, the real-time road generation process 2300 determines if the distance calculated in the state 2330 is less than the road width plus the shoulder width. If it is determined at the decision state 2334 that the distance is less than the road width plus the shoulder width, the real-time road generation process 2300 continues to a decision state 2338 to determine whether the distance is less than the road width. If it is determined at the decision state 2338 that the distance is not less than the road width, the real-time road generation process 2300 continues to a state 2340 to save the original terrain height for the point affected by the road.

At a state 2344, the real-time road generation process 2300 determines the height along the road segment. The real-time road generation process 2300 continues to a state 2350 to interpolate the height for shoulder feathering to remove any sharp discontinuities between the road shoulder and the surrounding terrain not affected by the road. At a state 2354, the real-time road generation process 2300 sets the result shader to be the same as the road shoulder shader.

However, if it is determined at the decision state 2338 that the distance from the next point to the road segment is less than the road width, the real-time road generation process 2300 continues to a state 2360 to interpolate the height along the road segment. At a state 2370, the real-time road generation process 2300 sets the result shader to the road shader.

After the state 2354, after the state 2370, if it is determined at the decision state 2324 that the next point is not within the road's extent, or if it is determined at the decision state 2334 that the distance is not less than the road width plus the shoulder width, the real-time road generation process 2300 continues to a decision block 2374 to determine whether there are any more points affected by the road. If it is determined at the state 2374 that more points are affected by the road, the real-time road generation process 2300 continues back to the state 2320 to determine the next point affected by the road. However, if it is determined at the state 2374 that no more points are affected by the road, the real-time road generation process 2300 continues to an end state 2390. The real-time road generation process 2300 terminates at the end state 2390.

Figure 24:
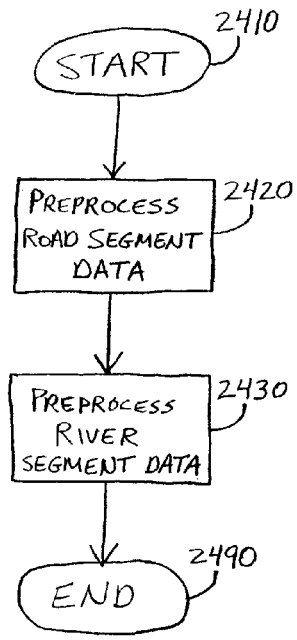
FIG. 24 is a flowchart illustrating an embodiment of a preprocess terrain process of the server-side system of the terrain generation system

FIG. 24 is a flowchart illustrating an embodiment of a preprocess terrain process 830 of the server-side system of the terrain generation system. Depending on the embodiment, the ordering of the states in FIG. 24 can be re-arranged, additional states can be added, and others can be omitted.

The preprocess terrain process 830 begins at a start state 2410. The preprocess terrain process 830 continues to a state 2420 to preprocess road segment data. The preprocessing of road segment data at the state 2420 includes determining the coordinates of the road points based on the road segment, for example, a connected series of line segments that define the center path of the road, and the road width. In addition, the road preprocessing at the state 2420 includes shading and flattening the existing terrain, adding a shoulder to the road, and feathering (blending) the shoulder to the surrounding terrain so that the terrain transitions smoothly to the surrounding terrain instead of having a sharp contrast or discontinuity between the shoulder and bordering terrain. The process of real-time road generation is described in more detail above with regard to FIG. 23.

At a state 2430, the preprocess terrain process 830 preprocesses river segment data. The preprocessing of river segment data at the state 2430 is similar to the road preprocessing at the state 2420 as described above. However, since rivers cannot travel uphill the way roads can, river preprocessing at the state 2430 cuts into the existing terrain as necessary to insure that the river only flows in a level or downhill direction. In addition, the river preprocessing at the state 2430 includes adding a trench depth into the existing terrain since rivers, unlike roads, have a depth into the terrain that defines the depth of the river. The preprocess terrain process 830 continues to an end state 2490. The preprocess terrain process 830 terminates at the end state 2490.

Figure 25:
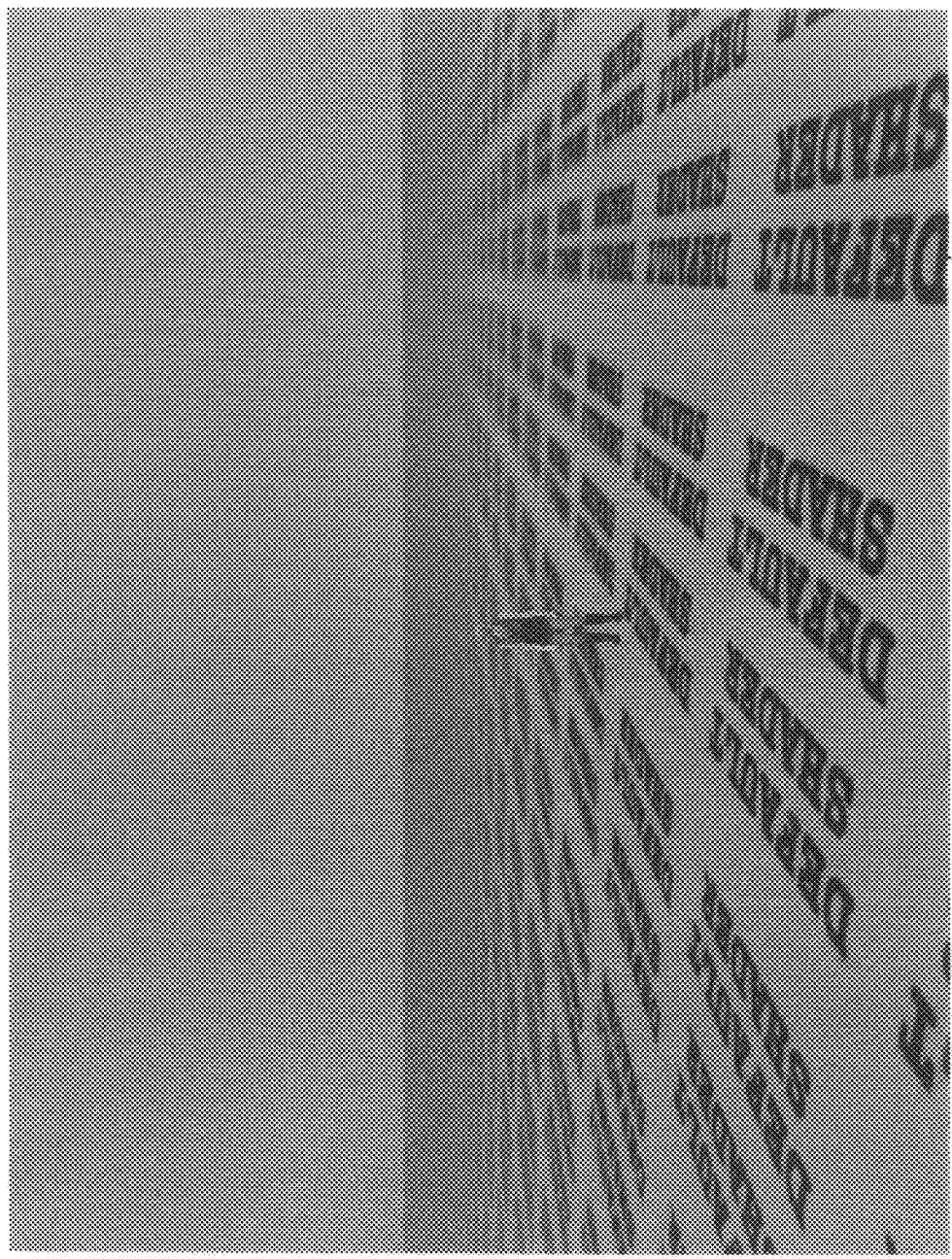
FIG. 25 is an example of a screen display showing a virtual world with no terrain features defined.

FIG. 25 is an example of a screen display 2500 showing a virtual world with no terrain features defined. In this example, a predetermined shader 2510 is applied by default in the absence of a shader being defined for a terrain. The screen display 2500 illustrates the terrain starting point of a world prior to the definition of any terrain features. The four subsequent figures, FIGS. 26-29 as described below, illustrate additional screen displays with various terrain features added to the default screen display of FIG. 25.

Figure 26:
FIG. 26 is an example of a screen display with mountains and other varying terrain height added to the default terrain shown in FIG. 25 with no terrain features defined.

FIG. 26 is an example of a screen display with mountains and other varying terrain height added to the default terrain shown in FIG. 25 with no terrain features defined.

Figure 27:
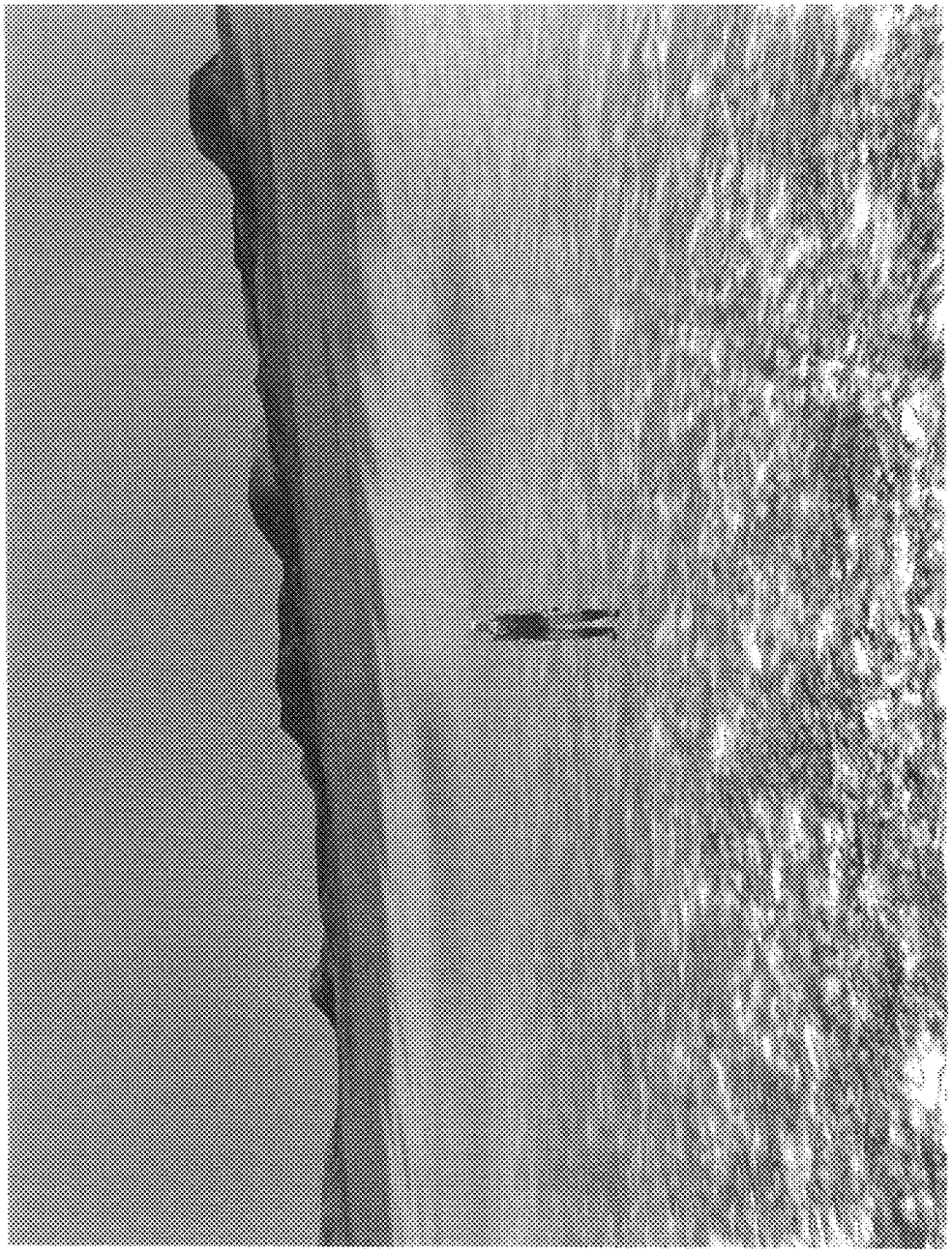
FIG. 27 is an example of a screen display with a shader feature defined for the ground texture in addition to the terrain height features shown in FIG. 26.

FIG. 27 is an example of a screen display with a shader feature defined for the ground texture in addition to the terrain height features shown in FIG. 26.

Figure 28:
FIG. 28 is an example of a screen display with flora defined, including grass, shrubs and trees, in addition to the other terrain features shown in FIG. 27.

FIG. 28 is an example of a screen display with flora defined, including grass, shrubs and trees, in addition to the other terrain features shown in FIG. 27.

Figure 29:
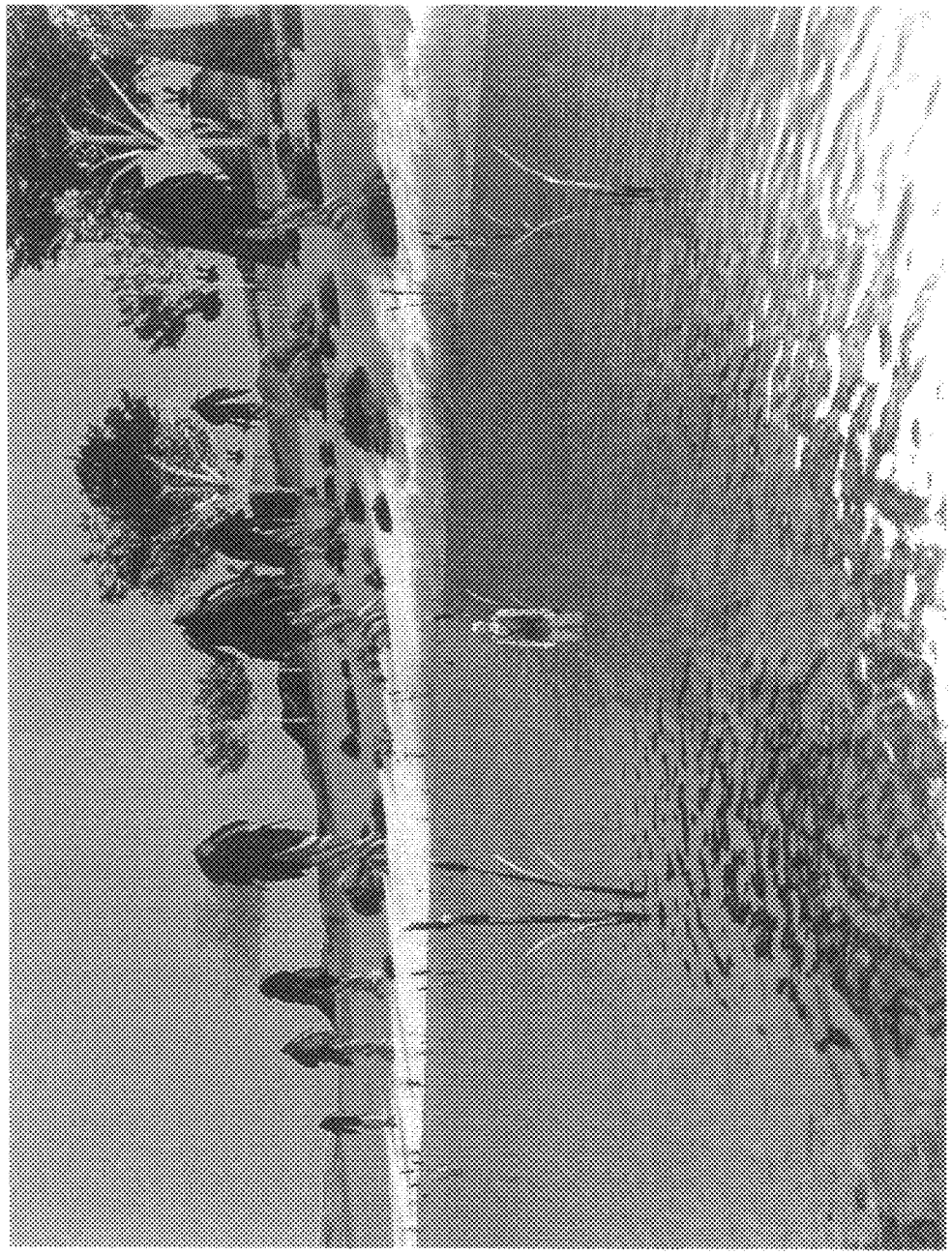
FIG. 29 is an example of a screen display with a river defined in addition to the other terrain features shown in FIG. 28.

FIG. 29 is an example of a screen display with a river defined in addition to the other terrain features shown in FIG. 28.

Figure 30:
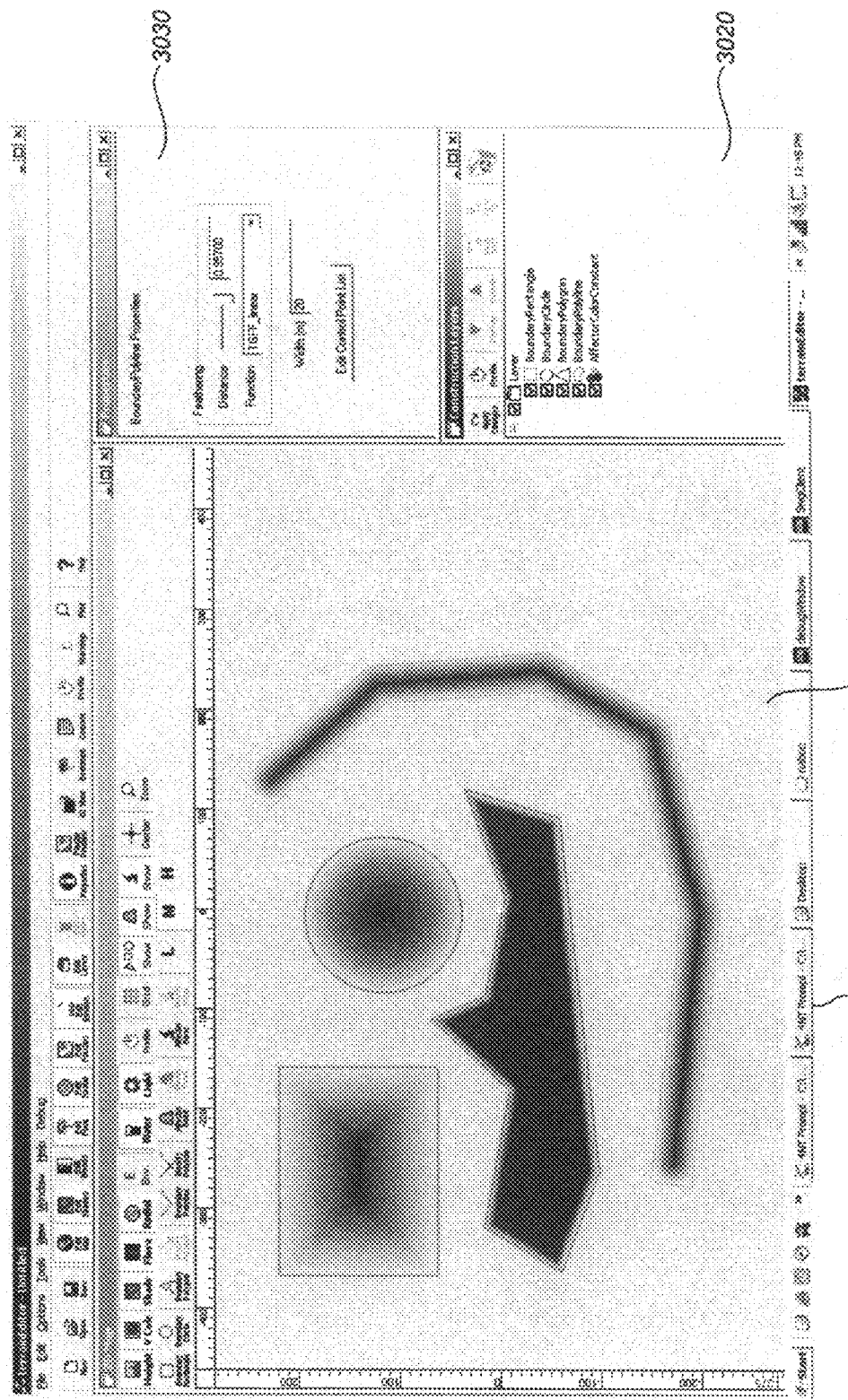
FIG. 30 is an example of a screen snapshot of the terrain editor tool for entering and modifying terrain rules.

FIG. 30 is an example of a screen snapshot 3000 of the terrain editor tool for entering and modifying terrain rules. The terrain designer or artist can edit the terrain features using the terrain editor tool, a custom graphical user interface tool that enables the designers and artists to create regions and families, and associate rules (affectors) with the regions and families. In some embodiments, the terrain editor tool generates a binary file that the terrain generator uses to generate and render the terrain in accordance with the terrain as defined by the designer or artist using the terrain editor tool.

The map view of the terrain editor tool represents a 2 D view of the terrain. Users can see a metadata representation of the terrain, including the ability to see height (for example, grayscale height field), color (for example, blending color onto the height field), shader (for example, colors that represent the placement of shaders), flora (for example, colors that represent the placement of flora), radial flora (for example, colors that represent the placement of radial flora), and water (for example, represented by the color blue). The terrain metadata refers to the data that flows through the terrain generator (the 2 D buffers) and is used to create the terrain geometry and describe to the terrain generation system where to place the terrain objects, such as flora, surface properties, environment data, etc. The user can turn off each individual representation if the user so chooses. In addition to the visual representation of the terrain data, the boundary editing occurs in this map view. Users can create, for example, circle, rectangle, and polygon boundaries.

The layer view is a hierarchical (tree) view of the terrain rules. Users can, for example, create, delete, move, copy, import and export rules. The users can utilize the layer view to select which rule is edited in the properties view.

The properties view is a form view with controls from which users can modify the parameters of the individual rules. The family views enable the designers or artists to create and edit, for example, shader, blend, fractal, flora, and radial flora families. The family view also enables asset previewing. In order to enable the designers or artists to quickly view the changes made to the terrain rules, the first-person view shows the terrain as if the user was walking around the terrain within the game.

The terrain editor tool can include, for example, the following features:

1) Set planet parameters—planet parameters, planet size, chunk and tile sizes, flora counts, etc.
2) Rule compilation complete with warnings/errors—invalid or incomplete parameters, in addition to asset validation, ensure that the data loaded by the game is correct. Examples include making sure for a FilterHeight that the high height is higher than the low height, or if applying an AffectorShader, the shader applied exists as a usable asset.
3) Rule profiling to determine bottlenecks in the rules—the users have complete control over the application of rules with the terrain editor tool. Since planets can be described with hundreds of rules, a built-in profiler shows the users which layers are the most resource expensive. In some embodiments, the terrain editor tool can graphically identify regions of the terrain generation that are more time-consuming to generate that other terrain regions.

4) View resource maps—the resource system uses fractals, so the designers are able to associate resources with regions and view the data in the terrain editor.

5) Layout static environment blocks—environment block data can be edited in the terrain editor tool, as environment blocks are associated with regions. For example, lighting, backdrops, environment maps, fog, and climate can be specified.

6) Surface properties—shader families enable the designers and artists to edit surface properties for shaders.

The terrain designers and artists can define and edit the terrain features using the terrain editor tool, a custom user interface tool that enables the designers and artists to create regions and families, and associate rules (affectors) with the regions and families. The terrain editor tool includes a map view that represents a 2 D view of the terrain. The terrain editor tool additionally includes a layer view, which is a hierarchical (tree) view of the terrain rules. Still further, the terrain editor tool includes a properties view, which is a form view with controls from which users can modify the parameters of the individual rules. The terrain editor tool can automatically generate procedural rules that define the terrain features according to the terrain definition entered by the terrain designers and artists. The terrain is stored as a set of rules defining the terrain features that are interpreted and rendered in real time. The terrain editor tool is described in more detail below with regard to FIGS. 30-34.

With the data to generate the terrain coming from a height field, the terrain generation system normally cannot create terrain on vertical walls for spires, arches and interesting rock formations. The users can instead create vertical walls by placing static meshes onto the terrain.

The terrain editor tool screen snapshot 3000 shown in FIG. 30 includes a 2 D map window 3010 for displaying the 2 D view of the terrain. In the 2 D map window 3010 shown in FIG. 30, the user has defined a rectangle, a circle, a polygon, and a polyline (a polygon build around a line segment). The shading shown in these defined objects illustrates the feathering effect of the boundaries of the objects.

The terrain editor tool screen snapshot 3000 in FIG. 30 additionally includes a construction layers window 3020. The construction layers window 3020 displays a hierarchical (tree) view of the terrain rules. The terrain editor tool screen snapshot 3000 can additionally include a properties window 3030 through which the user can view and modify various properties of the objects in the terrain.

Figure 31:
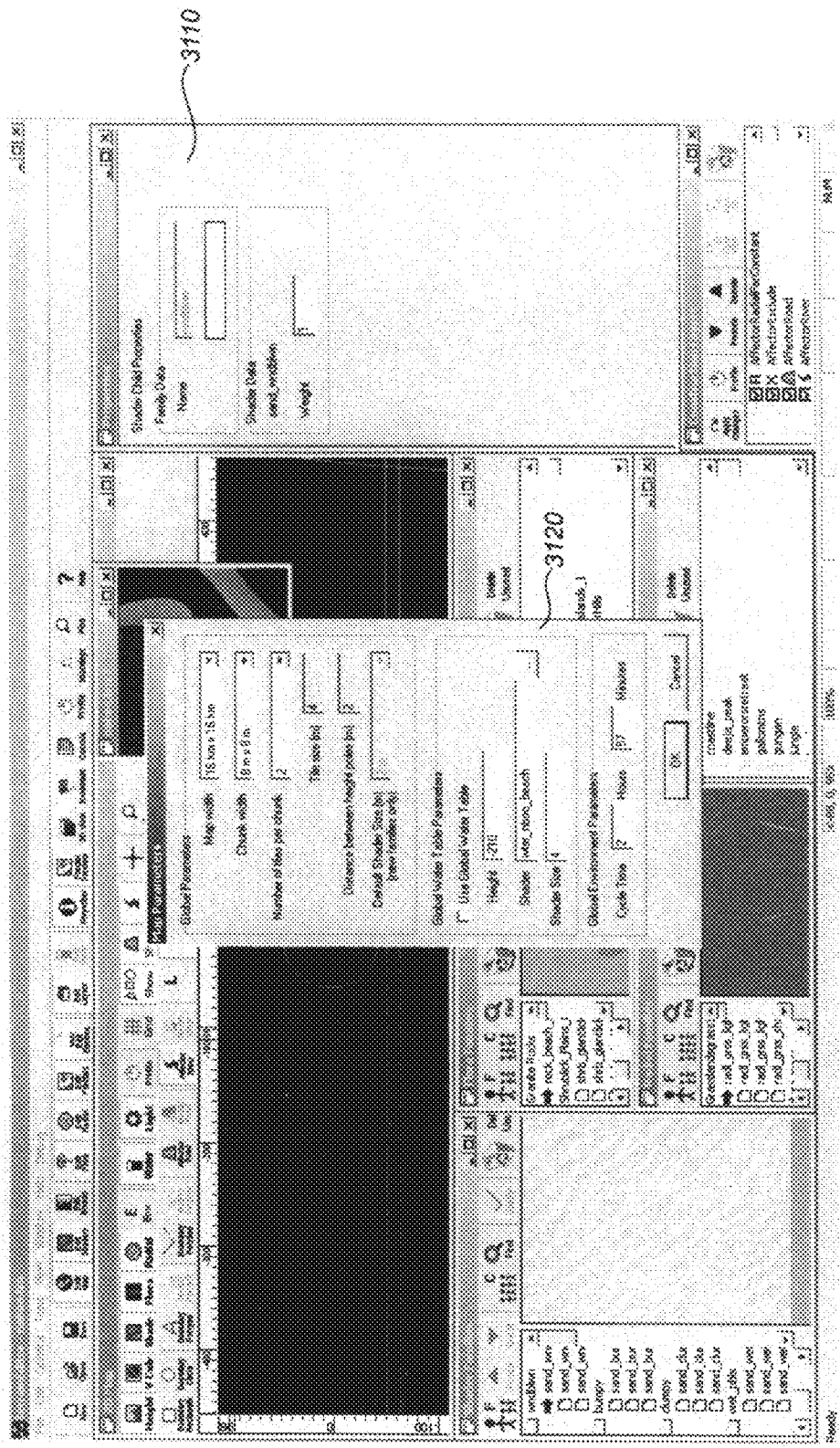
FIG. 31 is an example of a screen snapshot showing windows for display and entry of map parameters and shader child properties using the terrain editor tool.

FIG. 31 is an example of a screen snapshot 3100 showing windows for display and entry of map parameters and shader child properties using the terrain editor tool. The terrain editor tool screen snapshot 3100 shown in FIG. 31 includes a properties window 3110 for viewing and modifying shader child properties, such as family data and shader data. The terrain editor tool screen snapshot 3100 additionally includes a map parameters window 3120 for viewing and modifying various map parameters, such as global parameters, global water table parameters, and global environment parameters.

FIG. 32 is an example of a screen snapshot 3200 showing a window for display and entry of flora parameters using the terrain editor tool. The flora parameters screen snapshot 3200 displays current values to the user and allows the user to modify the values for maximum and minimum distances, tile size, tile border and seed. The flora parameters screen snapshot 3200 displays and enables the user to modify these values for collidable and non-collidable flora, as well as near radial and far radial flora. In addition, the terrain editor tools calculates and displays the approximate total flora that will be generated and rendered based on the current settings for the above parameters. These calculations of the approximate total flora are display only parameters and are not modifiable by the user.

Figure 33:
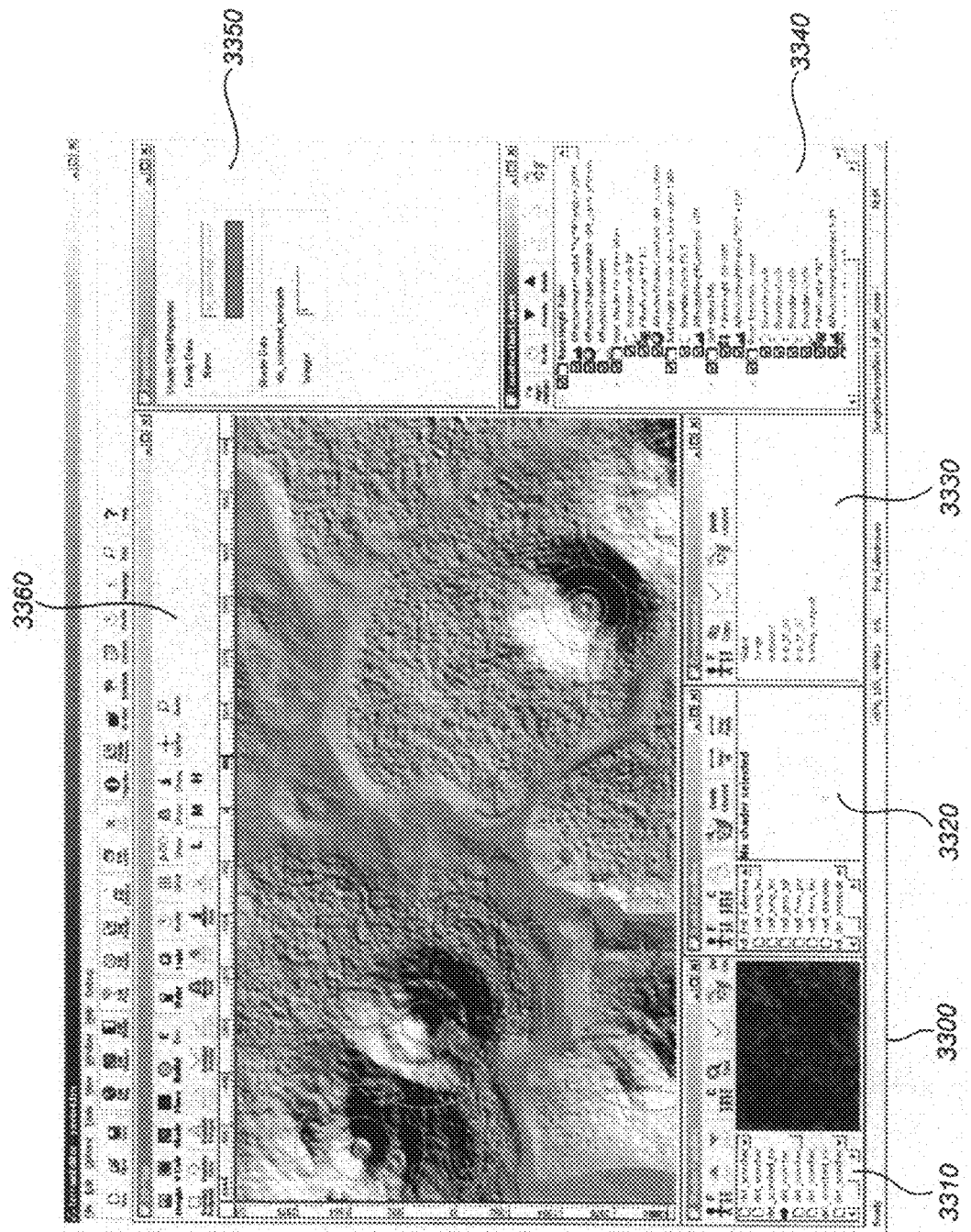
FIG. 33 is an example of a screen snapshot showing an example of a 2 D terrain map as entered using the terrain editor tool.

FIG. 33 is an example of a screen snapshot 3300 showing an example of a 2 D terrain map as entered using the terrain editor tool. The screen snapshot 3300 shown in FIG. 33 includes a shader families window 3310, a radial families window 3320, an environments window 3330, a construction layers window 3340, a properties window 3350, and a 2 D map window 3360.

Figure 34:
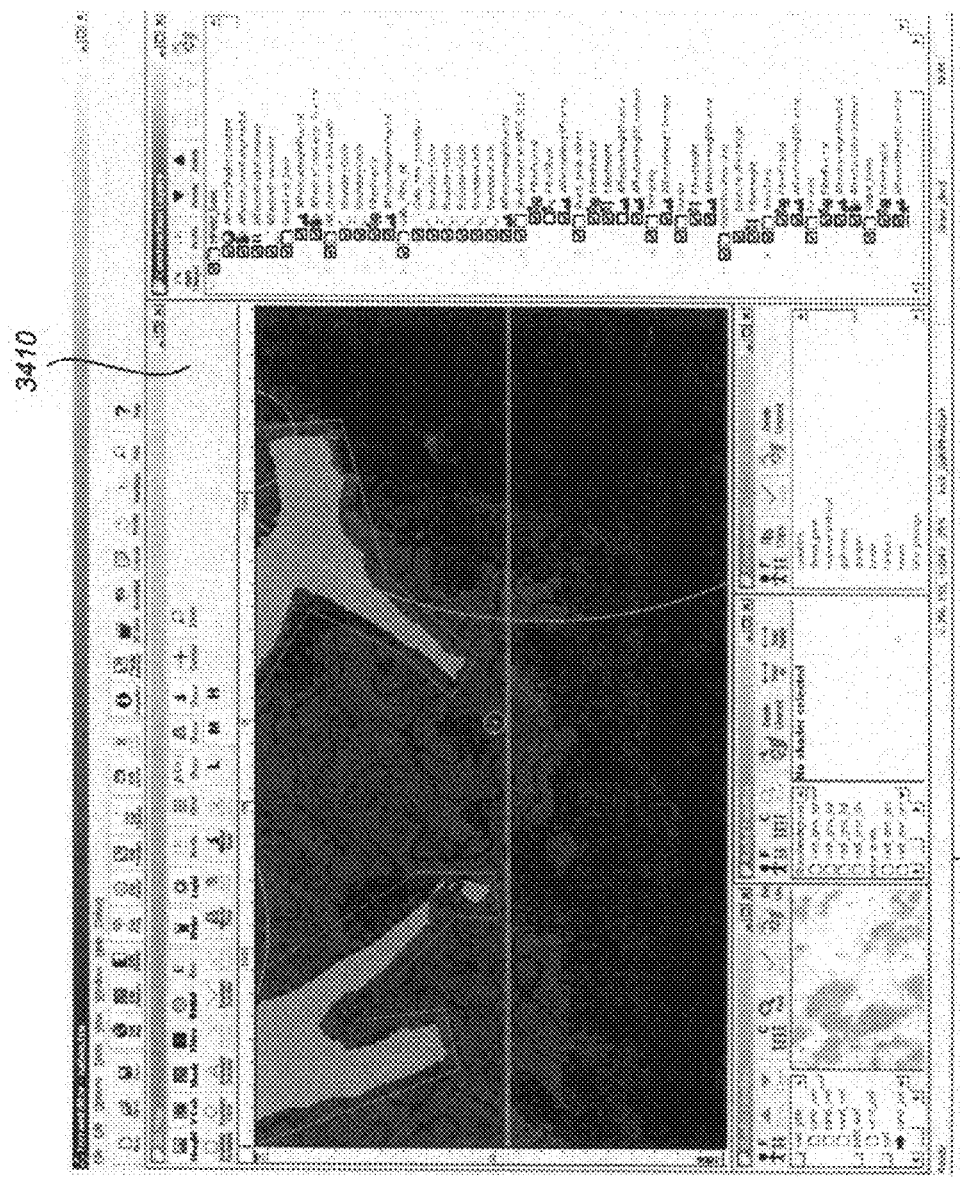
FIG. 34 is an example of a screen snapshot showing another example of 2 D terrain map as entered using the terrain editor tool.

FIG. 34 is an example of a screen snapshot 3400 showing another example of 2 D terrain map as entered using the terrain editor tool. The windows of the screen snapshot 3400 shown in FIG. 34 are similar to those shown in FIG. 33, for example. However, in the screen snapshot 3400 in FIG. 34, a 2 D map window 3410 illustrates a different terrain, and a construction layers window 3420 is increased in size in FIG. 34 to extend nearly the entire height of the screen snapshot 3400.

While the example screenshots of FIGS. 30-34 show several examples of the parameters and properties that can be viewed and modified, many more parameters and properties exist that are not shown. The following table (TABLE I.) lists additional parameters and properties that can be viewed and modified using the terrain editor tool:

TABLE I

| Rule Property | Rule Description |
| --- | --- |
| Affector Color Constant | Select color for rule |
| Affector Color Ramp Fractal | Select rule family and color ramp |
| Affector Color Ramp Height | Select rule color ramp and height low/high values |
| Affector Flora Static Collidable | Select to add/remove flora, specify flora type and set flora density for static collidable flora |
| Affector Flora Dynamic Far | Select to add/remove flora, specify flora type and set flora density for dynamic far flora |
| Affector Flora Dynamic Near | Select to add/remove flora, specify flora type and set flora density for dynamic near flora |
| Affector Flora Static Non-Collidable | Select to add/remove flora, specify flora type and set flora density for static non-collidable flora |
| Affector Height Constant | Select terrain height value for rule |
| Affector Height Fractal | Select terrain height value for rule for fractal family |
| Affector Height Terrace | Select terrace height and flat ratio values for rule |
| Affector River | Select river rule properties, including width, trench depth, flow velocity, bank and bottom shaders, water shader, water depth, water width, and feathering distance |

TABLE I-continued

| Rule Property | Rule Description |
| --- | --- |
| Affector Road | Select road rule properties, including width, shader, feathering height distance, and feathering shader distance |
| Affector Shader Constant | Select rule shader family and feathering parameters |
| Affector Shader Replace | Select rule shader replace families, including source family (the family to be replaced), destination family (the family to replace with), and feathering parameters |
| Boundary Circle | Select circle boundary rule properties, including feathering distance, boundary center coordinates, and boundary radius |
| Boundary Polygon | Select polygon boundary rule properties, including feathering distance and local water table height, shader and shader size |
| Boundary Polyline | Select polyline boundary rule properties, including feathering distance and width |
| Boundary Rectangle | Select rectangle boundary rule properties, including feathering distance, boundary left/right and near/far coordinates, and local water table height, shader and shader size |
| Filter Direction | Select filter direction rule properties, including feathering distance, and minimum and maximum angle settings for filter setting to have effect |
| Filter Fractal | Select filter fractal rule properties, including fractal family, low and high fractal settings, and feathering distance |
| Filter Height | Select filter height rule properties, including feathering distance, filter low height, and filter high height |
| Filter Shader | Select filter shader rule properties, including shader family |
| Filter Slope | Select filter slope rule properties, including feathering distance, filter minimum angle, and filter maximum angle |
| Layer | Select layer rule properties, including invert boundaries and invert filter settings, and layer notes |
| Flora Group | Select flora group rule properties, including flora family data |
| Flora Child | Select flora child rule properties, including flora family name, child weight data, swaying displacement and period, scaling minimum value, and scaling maximum value |
| Fractal Group | Select fractal group rule properties, including fractal seed, X-coordinate scale, Z-coordinate scale, bias, gain, octaves, combination rule, frequency, amplitude, X offset, and Z offset |
| Fractal Child | Select fractal child rule properties |
| Radial Group | Select radial group properties |
| Radial Child | Select radial child rule properties, including family name data, child weight, distance, width and height data, and swaying displacement and period data |
| Shader Group | Select shader group properties |
| Shader Child | Select shader child rule properties, including family name data, and shader weight data |
| Environment Group | Select environment group rule properties |

The following rule layers define an additional example of terrain rules. In this example, a base terrain layer is applied across the entire planet consisting of the sand shader, 20 meter high gentle rolling hills, the desert environment for lighting, ambient sounds, sun/moon/sky, a sand dune color ramp, and small rocks. Next, in areas where the specified fractal output is between 0.45 and 0.55, the terrain is terraced every 7 meters, and color the terrain light brown. In a circle centered at the origin with a 100 meter radius, gradually lower the terrain height to 0 meters, apply the swampy environment, apply swamp trees, and place a water table with swamp water at a height of 4 meters. In addition, for any areas of terrain over 17 meters in height, replace the sand shader with windy sand. Next, on steep slopes of greater than 60 degrees, apply the cliff face color ramp anywhere there is a color ramp. Next, in a polygon around the origin about 500 square meters in area, place small grass on any slopes that face north. Next, cut a small 20 meter by 20 meter hole in the terrain for a cave entrance. Finally, add a 20 meter wide river that starts 1 meter to the west and ends at the origin (0, 0), and add a 10 meter wide road that starts 1 kilometer to the north and ends at the origin.

1) Layer—Base terrain
    1. AffectorShaderConstant, Sand
    2. AffectorHeightFractal, 20 m high rolling hills
    3. AffectorEnvironment—Desert
    4. AffectorColorRampFractal, Sand dune color ramp
    5. AffectorFloraNonCollidableConstant—SmallRocks
2) Layer—Terrace height based on fractal filter
    1. FilterFractal, 0.45, 0.55
    2. AffectorHeightTerrace, 7 m terrace
    3. AffectorColorConstant, Light brown 3) Layer—Lower height near origin
   1. Boundary circle, x=0, z=0, r=100
   2. BoundaryRectangle, x=−100, z=−100, x=100, z=100, swamp water, height of 4 m
   3. AffectorHeightConstant, 0 meters
   4. AffectorEnvironment, Swampy
   5. AffectorFloraCollidableConstant, SwampTrees
4) Layer—Create a shader band on the tops of all of the dunes
   1. FilterHeight, 17 m, 100 m
   2. AffectorShaderReplace, Replace Sand with Windy Sand
5) Layer—On steep slopes, add the color ramp if the sand shader was used
   1. FilterSlope, (60 to 90 degrees)
   2. FilterShader, Sand
   3. AffectorColorRampHeight, cliff face color ramp
6) Layer—Grass only grows on hills facing north near the origin
   1. BoundaryPolygon, drawn convex polygon with an area of about 500 sq. m
   2. FilterDirection, North (−15 to 15 degrees)
   3. AffectorRadialNearConstant, SmallGrass
7) Layer—Exclude the terrain for the cave entrance
   1. BoundaryRectangle, x0=−30, y0=40, x1=−10, y1=60
   2. AffectorExclude
8) Layer—Roads and rivers
   1. AffectorRoad, startX=0, startZ=1000, endX=0, endZ=0, width=8
   2. AffectorRiver, startX=−1000, startZ=0, endX=0, endZ=0, width=20, depth=10

Certain embodiments of the terrain generation system can generate terrain in an execution thread separate from the game execution thread. Players with single-processor machines moving at run or walk speed see little to no adverse effect of terrain generation. When moving beyond running or walking speeds, some degradation in the performance of terrain generation may be noticeable. Players with multi-processor machines have effectively no adverse terrain generation degradation when traversing the terrain at almost any player speed.

In one embodiment, the terrain generation system attempts to spread the load of terrain generation over several game frames in order to minimize the per frame performance cost of terrain generation. Additionally, when the player is not moving, the terrain generation system can build terrain in anticipation of the player requesting to move.

In some embodiments, the terrain generation system includes two built-in profilers. A first profiler executes in the terrain generator and allows analysis of rules on a per-rule basis to determine which layers are taking the most time with regard to terrain generation. With rules being interpreted on both the client computer and the server, users sometimes have the desire to view the data within the terrain generation tool to allow the users to optimize their rules.

A second profiler can be used in a debug mode and can inform the user how efficiently the terrain generation system is rendering the terrain. Information, such as the number of shader buckets, blends, flora and radial flora rendered, can assist the user in optimizing the client terrain data.

The terrain generation system can include various additional optimization techniques, such as limiting the amount of terrain generated in client/server applications. Resources for client/server applications, such as memory and disk space, can be minimized by generating terrain only when necessary. For example, the terrain generation system can detail various metrics and conditions used to identify these conditions.

The terrain system can use a quad tree geography to determine which chunks at which detail levels are to be displayed (referred to as level-of-detail, or LOD, techniques). If the chunks at the desired detail level do not exist, the terrain generation system requests bitmaps from the terrain generator that correspond to, for example, height information, color information, shader information, flora information, and radial flora information.

In some embodiments, terrain level-of-detail is not used on the server side. However, the server-side terrain generation system can use the same chunk and tile organization pattern as the client-side system. The server generates the terrain chunks under those objects for which terrain generation is desired.

The terrain generation system can use the approach of tiled textures. A shader map is used to associate a (possibly unique) texture with a particular tile. In the case of two different families that are tile neighbors, a blend shader is automatically generated with an appropriate alpha map depending on surrounding shaders. For example, a shader can share the same family with its neighbors and can be rendered in one pass. Alternatively, it is possible for a shader to have up to four shaders and three blends. When adding in the normal maps for per-pixel lighting, the number of textures can approach 11 textures per tile, for example.

In order to avoid numerous distinct draw calls to the terrain generation system per tile, the terrain generation system queues up tiles to be rendered within a terrain primitive sorter. The terrain primitive sorter sorts according to a vertex buffer format, as flexible vertex format (FVF) switching is the most resource intensive. Within the FVF lists, the terrain primitive sorter batches up tiles with like shaders. Within each shader batch for each FVF, the terrain primitive sorter builds one large dynamic vertex buffer maximizing the number of tiles per vertex buffer for optimal rendering (for example, 256 K) and sending the geometry to the card in as few draw calls as possible. This technique alone can increase rendering performance of the terrain by 300%.

Some embodiments of the terrain generation system use vertex coloring, dynamic lighting, and per-pixel bump mapping to light the terrain. Vertex coloring is used to break up the tiling that is visible in the textures. Dynamic lighting is used to handle time of day. The terrain generation system uses these lighting considerations when building geometry for terrain.

The terrain generation system does not cast shadows, but it can receive shadows. However, this is the result of a performance trade-off, and other embodiments of the terrain generation system can cast shadows as well as receive shadows.

Administrators for the virtual world can increase the landmass simply by changing the planet size in the terrain editor tool. Terrain has the base rule set applied until a user changes the new areas with additional rules. The user can add new rules to the terrain system anytime after initial terrains have been developed. The user can opt to take advantage of the new features, and rules can also be location dependent. An example is adding an erosion affector, which modifies field heights to simulate erosion, or adding an affector to bake lighting into the vertex colors.

The terrain generation system can reuse libraries of rules and through slight modifications, such as changing the fractal seed or parameters, new terrain can be generated. Since the terrain files are small in size, they can be sent to new clients via patching. In this way, many planets can be defined with advantageous reusing of assets.

While the above detailed description has shown, described, and pointed out novel features of the invention as applied to various embodiments, it will be understood that various omissions, substitutions, and changes in the form and details of the device or process illustrated may be made by those skilled in the art without departing from the intent of the invention. The scope of the invention is indicated by the appended claims rather than by the foregoing description. All changes that come within the meaning and range of equivalency of the claims are to be embraced within their scope.

What is claimed is:

1. A method of generating terrain in a virtual world, the method comprising:

receiving in a terrain generator a plurality of procedural rules that procedurally describe the terrain in a virtual world without storing terrain data, wherein each rule affects the generation of a portion of the terrain including terrain properties and each rule including at least boundaries, filters, and affectors;

generating terrain in the virtual world in accordance with the plurality of procedural rules by writing data to a buffer for rendering terrain in real time on a visual display, wherein the plurality of procedural rules is organized into hierarchical layers such that a single location in the terrain can have multiple procedural rules that overlap, wherein when multiple procedural rules overlap the terrain generator specifies a blend region, wherein the plurality of procedural rules is textually represented so that the boundaries, filters, and affectors are assigned numeric values that represent desired attributes in a logical textual format, wherein the textual representation of the plurality of procedural rules describes the dynamic aspects of the terrain in the virtual world, wherein modification of the terrain in a virtual world is enabled by adding or deleting at least one procedural rule from the plurality of procedural rules; and providing a resource management policy for deallocating memory allocated to unused or unnecessary portions of the terrain.

2. A method of managing virtual terrain, the method comprising:

allocating memory for a plurality of areas of virtual terrain;

associating a priority level to each area of the plurality of areas of virtual terrain for memory management, wherein said each area of virtual terrain is defined by a plurality of procedural rules textually represented so that boundaries, filters and affectors are assigned numeric values that represent desired attributes in a logical textual format, wherein the textual representation of the plurality of procedural rules describes the dynamic aspects of the terrain in the virtual world, wherein the plurality of procedural rules is organized into hierarchical layers such that a single location in the terrain can have multiple procedural rules that overlap, wherein when multiple procedural rules overlap the terrain generator specifies a blend region, and wherein modification of said each area of virtual terrain is enabled by adding or deleting at least one procedural rule from the plurality of procedural rules; and deallocating memory of the virtual terrain based at least in part on the priority levels of the plurality of areas of virtual terrain.

3. The method of claim 2, additionally comprising assigning a priority level to areas of the virtual terrain where an avatar is positioned.

4. The method of claim 3, additionally comprising assigning a priority level to areas of the virtual terrain that are proximate to the avatar.

5. The method of claim 4, wherein the priority level assigned to the areas of the virtual terrain where the avatar is positioned is higher than the priority level assigned to the areas of the virtual terrain that are proximate to the avatar.

6. The method of claim 2, wherein one of four priority levels is assigned to the areas of the virtual terrain where an avatar is positioned and to areas of the virtual terrain that are proximate to the avatar.

7. The method of claim 2, wherein deallocating occurs when the number of areas of the virtual terrain exceeds a threshold.

8. A system for managing virtual terrain, the method comprising:

means for allocating memory for a plurality of areas of virtual terrain;

means for associating a priority level to each area of the plurality of areas of virtual terrain for memory management, wherein said each area of virtual terrain is defined by a plurality of procedural rules textually represented so that boundaries, filters and affectors are assigned numeric values that represent desired attributes in a logical textual format, wherein the textual representation of the plurality of procedural rules describes the dynamic aspects of the terrain in the virtual world, wherein the plurality of procedural rules is organized into hierarchical layers such that a single location in the terrain can have multiple procedural rules that overlap, wherein when multiple procedural rules overlap the terrain generator specifies a blend region, wherein modification of said each area of virtual terrain is enabled by adding or deleting at least one procedural rule from the plurality of procedural rules; and means for deallocating memory of the virtual terrain based at least in part on the priority levels of the plurality of areas of virtual terrain.

9. The system of claim 8, additionally comprising means for assigning a priority level to areas of the virtual terrain where an avatar is positioned.

10. The system of claim 8, additionally comprising means for assigning a priority level to areas of the virtual terrain that are proximate to an avatar.

11. The system of claim 8, wherein the means for deallocating is invoked when the number of areas of the virtual terrain exceeds a threshold.

12. A non-transitory computer-readable medium encoded with a computer program comprising executable instructions that cause a computer to:

allocate memory for a plurality of areas of virtual terrain;

associate a priority level to each area of the plurality of areas of virtual terrain for memory management, wherein said each area of virtual terrain is defined by a plurality of procedural rules textually represented so that boundaries, filters and affectors are assigned numeric values that represent desired attributes in a logical textual format, wherein the textual representation of the plurality of procedural rules describes the dynamic aspects of the terrain in the virtual world;

wherein the plurality of procedural rules is organized into hierarchical layers such that a single location in the terrain can have multiple procedural rules that overlap, wherein when multiple procedural rules overlap the terrain generator specifies a blend region, wherein modification of said each area of virtual terrain is enabled by adding or deleting at least one procedural rule from the plurality of procedural rules; and deallocate memory of the virtual terrain based at least in part on the priority levels of the virtual terrain.

13. The computer readable medium of claim 12, further comprising executable instructions that cause a computer to assign a priority level to areas of the virtual terrain where an avatar is positioned.

14. The computer readable medium of claim 12, further comprising executable instructions that cause a computer to assign a priority level to areas of the virtual terrain that are proximate to an avatar.

15. The computer readable medium of claim 12, wherein deallocating occurs when the number of areas of the virtual terrain exceeds a threshold.

16. A system for managing memory, the system comprising:

a plurality of areas of virtual terrain, each area of the plurality of areas of virtual terrain having an associated priority level assigned for memory management, wherein said each area of virtual terrain is defined by a plurality of procedural rules textually represented so that boundaries, filters and affectors are assigned numeric values that represent desired attributes in a logical textual format, wherein the textual representation of the plurality of procedural rules describes the dynamic aspects of the terrain in the virtual world;

wherein the plurality of procedural rules is organized into hierarchical layers such that a single location in the terrain can have multiple procedural rules that overlap, wherein when multiple procedural rules overlap the terrain generator specifies a blend region, wherein modification of said each area of virtual terrain is enabled by adding or deleting at least one procedural rule from the plurality of procedural rules; and a terrain manager for allocating and deallocating memory for the virtual terrain based at least in part on the priority level.

17. The system of claim 16, wherein areas of the virtual terrain that are near an avatar have a selected priority level.

18. The system of claim 16, wherein areas of the virtual terrain that include an avatar have a selected priority level.

19. The method of claim 1, wherein the terrain properties include geometric properties.

20. The method of claim 1, wherein the virtual world is a massively multiplayer online game (MMO), wherein the textual representation of the plurality of procedural rules describing the dynamic aspect of the terrain in the MMO involves specifying surface terrain properties of the MMO by tagging terrain tiles with game-specific data that affects what a player of the MMO experiences, and wherein tagging terrain tiles with game-specific data includes marking the terrain tiles as slippery, damage inflicting, or impassable.

21. The method of claim 1, wherein the virtual world is a massively multiplayer online game (MMO), and wherein the textual representation of the plurality of procedural rules describing the dynamic aspect of the terrain in the MMO involves real-time modification of the procedurally-generated terrain in the MMO by specifying certain region and deformation parameters to deform the terrain in real time for various terrain features.

22. The method of claim 21, wherein the deformation of the terrain in real time includes enlarging landmass.

23. The method of claim 1, wherein the virtual world is a massively multiplayer online game (MMO), and wherein the textual representation of the plurality of procedural rules describing the dynamic aspect of the terrain in the MMO involves specifying modifications to the terrain in the MMO as a result of events in the MMO.

24. The method of claim 1, wherein the virtual world is a massively multiplayer online game (MMO), and wherein the textual representation of the plurality of procedural rules describing the dynamic aspect of the terrain in the MMO involves real-time road generation including:

shading and flattening the terrain;

adding a shoulder to a road; and feathering the shoulder to surrounding terrain so that the terrain transitions smoothly to the surrounding terrain.

* * * * *